US012737785B2

(12) United States Patent
Levine

(10) Patent No.: US 12,737,785 B2
(45) Date of Patent: Sep. 15, 2026

(54) BILLBOARD SIMULATION AND ASSESSMENT SYSTEM

(71) Applicant: DRIVE YOUR ART, LLC., San Juan, PR (US)

(72) Inventor: Robert Levine, San Juan, PR (US)

(73) Assignee: DRIVE YOUR ART, LLC.

(*) Notice: Subject to any disclaimer, the term of this patent is extended or adjusted under 35 U.S.C. 154(b) by 302 days.

(21) Appl. No.: 18/549,556

(22) PCT Filed: Mar. 1, 2022

(86) PCT No.: PCT/US2022/018347
§ 371 (c)(1),
(2) Date: Sep. 7, 2023

(87) PCT Pub. No.: WO2022/192033
PCT Pub. Date: Sep. 15, 2022

(65) Prior Publication Data

US 2024/0169397 A1 May 23, 2024

Related U.S. Application Data

(60) Provisional application No. 63/158,126, filed on Mar. 8, 2021.

(51) Int. Cl.

| | |
|---|---|
| ***G06T 19/00*** | (2011.01) |
| ***G06F 3/147*** | (2006.01) |
| ***G06Q 30/0251*** | (2023.01) |

(52) U.S. Cl.
CPC ......... *G06Q 30/0267* (2013.01); *G06F 3/147* (2013.01); *G06T 19/003* (2013.01)

(58) Field of Classification Search
CPC .......................... G06T 19/006; G06Q 30/0644
See application file for complete search history.

(56) References Cited

U.S. PATENT DOCUMENTS 6,654,019 B2 * 11/2003 Gilbert ..................... H04N 5/77 345/474
9,390,561 B2 * 7/2016 Brown .................. G06T 19/006
(Continued)

FOREIGN PATENT DOCUMENTS

CN 102037483 A 4/2011
CN 112136152 A 12/2020
(Continued)

OTHER PUBLICATIONS

Stavrinos et al., Visual behavior differences in drivers across the lifespan: A digital billboard simulator study, 2016 (Year: 2016).*
(Continued)

*Primary Examiner* — Phong X Nguyen
(74) *Attorney, Agent, or Firm* — Adler Pollock & Sheehan P.C.

(57) ABSTRACT

A system and method having at least one processor communicatively coupled to a memory, a display, and at least one database. The processor can be configured to execute computer readable instructions stored in the memory to perform operations including (i) accessing graphical data and at least one advertisement from the at least one database, (ii) generating on the display a three-dimensional (3D) moving representation of an environment including a billboard displaying the at least one advertisement, in which the environment and billboard position correspond to a user's vantage point, and (iii) updating the 3D moving representation of the environment and billboard in response to changes in the user's vantage point.

20 Claims, 25 Drawing Sheets

(56) References Cited

U.S. PATENT DOCUMENTS

| | | | | |
|---|---|---|---|---|
| 9,791,290 | B2* | 10/2017 | Kraus | G06Q 30/0241 |
| 10,380,762 | B2* | 8/2019 | Lee | G06T 15/20 |
| 10,909,576 | B1 | 2/2021 | Arivukkarasu et al. | |
| 11,182,953 | B2* | 11/2021 | Hamilton | G06T 19/006 |
| 11,250,617 | B1* | 2/2022 | Sempe | H04L 65/611 |
| 12,496,721 | B2* | 12/2025 | Lee | B25J 9/1689 |
| 2002/0063709 | A1* | 5/2002 | Gilbert | H04N 23/698<br>345/427 |
| 2010/0174586 | A1 | 7/2010 | Berg et al. | |
| 2011/0093350 | A1* | 4/2011 | Laumeyer | G06Q 30/0277<br>705/14.73 |
| 2012/0194516 | A1* | 8/2012 | Newcombe | G06T 17/00<br>345/420 |
| 2013/0050258 | A1* | 2/2013 | Liu | G06F 3/013<br>345/633 |
| 2013/0293582 | A1* | 11/2013 | Ng-Thow-Hing | G06T 19/006<br>345/633 |
| 2014/0002440 | A1* | 1/2014 | Lynch | G06T 19/00<br>345/619 |
| 2014/0126066 | A1 | 5/2014 | Clavin et al. | |
| 2014/0278847 | A1* | 9/2014 | Gallo | G06Q 30/0252<br>705/14.5 |
| 2016/0153789 | A1* | 6/2016 | Gallar | G01C 21/3635<br>701/400 |
| 2018/0018702 | A1* | 1/2018 | Gibson | G06Q 30/0266 |
| 2019/0050907 | A1* | 2/2019 | Nomura | G06Q 30/0266 |
| 2019/0221040 | A1* | 7/2019 | Shantharam | G06T 19/006 |
| 2019/0272673 | A1* | 9/2019 | Mathur | G06T 15/20 |
| 2019/0287493 | A1 | 9/2019 | Neustein | |
| 2019/0379948 | A1* | 12/2019 | McClam | H04N 21/4532 |
| 2020/0090216 | A1* | 3/2020 | Gudai | G06F 16/9535 |
| 2020/0156655 | A1* | 5/2020 | Chung | B60W 50/14 |
| 2020/0160602 | A1* | 5/2020 | Ghatak | G06Q 30/0261 |
| 2020/0219323 | A1* | 7/2020 | Varshney | H04L 51/52 |
| 2020/0311775 | A1 | 10/2020 | Fernandez et al. | |
| 2020/0410725 | A1* | 12/2020 | Haines | A63F 13/40 |
| 2021/0001211 | A1 | 1/2021 | Mullen | |
| 2021/0217060 | A1* | 7/2021 | Pulido | G06Q 30/0251 |
| 2022/0084296 | A1* | 3/2022 | Sadalgi | G06T 11/10 |
| 2023/0153941 | A1* | 5/2023 | Jin | H04N 23/95<br>382/100 |

FOREIGN PATENT DOCUMENTS

| | | |
|---|---|---|
| JP | 2007108834 A | 4/2007 |
| JP | 2016045814 A | 4/2016 |
| JP | 2021518574 A | 8/2021 |
| WO | 2019178567 A1 | 9/2019 |

OTHER PUBLICATIONS

Mollu et al., Driving simulator study on the influence of digital illuminated billboards near pedestrian crossings, 2018 (Year: 2018).*

Lee et al., Evaluation of Urban Landscape Outdoor Advertisement Signboards Using Virtual Reality, 2020 (Year: 2020).*

"International Search Report and Written Opinion received for PCT Patent Application No. PCT/US2022/018347, mailed on May 16, 2022", 7 pages.

"Extended European Search Report received for European Patent Application No. 22767674.9, mailed on Jun. 19, 2024", 7 pages.

* cited by examiner

214

216

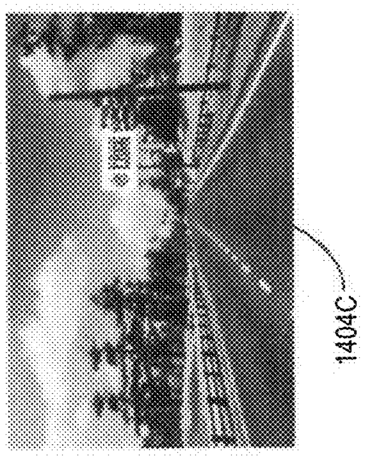
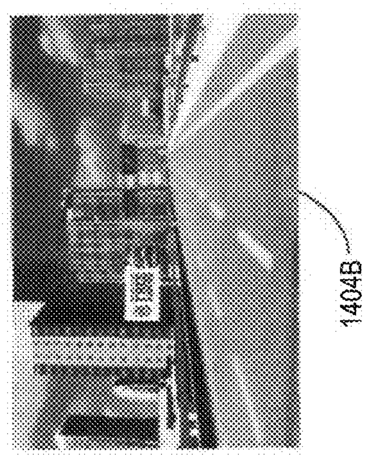
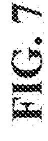
FIG. 7
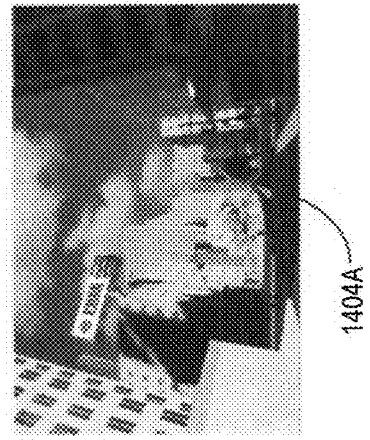

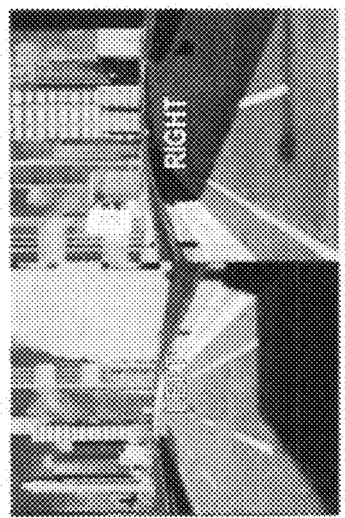
FIG. 9A
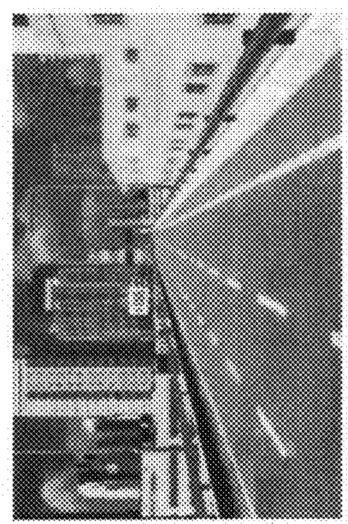

1408B

1410

1412

BILLBOARD TYPE/DIMENSIONS

1408A

1412A

BILLBOARD SIMULATION AND ASSESSMENT SYSTEM

CROSS REFERENCE TO RELATED APPLICATIONS

This application is a National Phase filing under 35 U.S.C § 371 of International Application No. PCT/US2022/018347 filed Mar. 1, 2022, which claims benefit from U.S. Provisional Patent Application No. 63/158,126 filed Mar. 8, 2021, each of which is incorporated herein by reference in their entirety.

FIELD OF THE INVENTION

The present invention relates generally to billboards, and more particularly to systems and methods for simulating and previewing billboards in selected environments on computer platforms.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In one aspect, the present invention provides system and method having at least one processor communicatively coupled to a memory, a display, and at least one database. The processor can be configured to execute computer readable instructions stored in the memory to perform operations including (i) accessing graphical data and at least one advertisement from the at least one database, (ii) generating on the display a three-dimensional (3D) moving representation of an environment including a billboard displaying at least one advertisement, in which the environment and billboard position correspond to a user's vantage point, and (iii) updating the 3D moving representation of the environment and billboard in response to changes in the user's vantage point.

An embodiment is a system for simulating and previewing billboards in selected environments on computer platforms, the system includes a memory, a display, at least one database, and at least one processor communicatively coupled to the memory, the display, and the at least one database. In operation, the processor is configured to execute computer readable instructions stored in the memory to perform operations including: accessing graphical data and at least one advertisement from the at least one database, generating on the display a three-dimensional (3D) moving representation of an environment having a billboard displaying the at least one advertisement such that visualization of the billboard corresponds to a user's vantage point, and updating the 3D moving representation of the environment and the billboard in response to changes in the user's vantage point.

In some embodiments, the advertisement may include alphabets, numbers, words, symbols, images, graphics and videos. The environment of the system may be in virtual image mode and in actual image mode. The elements of the environment may be stored in the at least one database or uploaded to the at least one database. In operation, the parameters of the billboard may be modified or the advertisement may be modified in the environment, whether in virtual image mode or actual image mode.

In another embodiment, in operation, the processor may further be configured to perform operations including creating dynamic video format or static image format of the 3D moving representation of the environment and the billboard. In yet another embodiment, the system may further be configured such that sensory stimuli of the environment may be altered. Subsequent to altering of the sensory stimuli, the 3D moving representation of the environment may be updated in response to such altering of the sensory stimuli, and the processor may further be configured to create dynamic video format or static image format of the 3D moving representation of the environment and the billboard to be displayed on portable electronic devices including AR/VR headsets.

An embodiment is a method for simulating and previewing billboards in selected environment on computer platform system, the method including, in the system having at least one processor communicatively coupled to a memory, a display, and at least one database, where the processor is configured to execute computer readable instructions stored in the memory to perform operations. In operation, the method includes: accessing, by the processor, of graphical data and at least one advertisement from the at least one database; generating, by the processor, on the display a three-dimensional (3D) moving representation of an environment having a billboard displaying the at least one advertisement such that the visualization of the billboard corresponds to a user's vantage point; and updating, by the processor, of the 3D moving representation of the environment and the billboard in response to changes in the user's vantage point.

In some embodiments, the at least one advertisement includes at least one of alphabets, numbers, words, symbols, images, graphics and videos. In some instances, the environment can be in virtual image mode or actual image mode. In operation, the environment can include elements stored in or uploaded to the at least one database.

In one embodiment, the method further includes creating, by the processor, at least one of dynamic video format and static image format of the 3D moving representation of the environment and the billboard. In another embodiment, the generating step of a method further includes modifying, by the processor, parameters of the billboard or the at least one advertisement.

In another embodiment, the generating step of a method further includes altering, by the processor, on the display the 3D moving representation of sensory stimuli of the environment. In yet another embodiment, the updating step includes updating the 3D moving representation of the environment in response to the altering sensory stimuli of the environment.

In one embodiment, a method for simulating and previewing billboards in selected environment on computer platform system further includes creating, by the processor, at least one of dynamic video format and static image format of the 3D moving representation of the environment and the billboard. In another embodiment, the method further includes displaying, on portable electronic devices including AR/VR headsets, the at least one of dynamic video format and static image format of the 3D moving representation of the environment and the billboard.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The invention will be more fully understood by reference to the detailed description, in conjunction with the following figures, wherein:

FIG. 7 is an illustration of a virtual image mode in accordance with an aspect of the present invention.

FIGS. 9A-9B are illustrations of roadway features.

DETAILED DESCRIPTION OF THE INVENTION

Figure 1A:
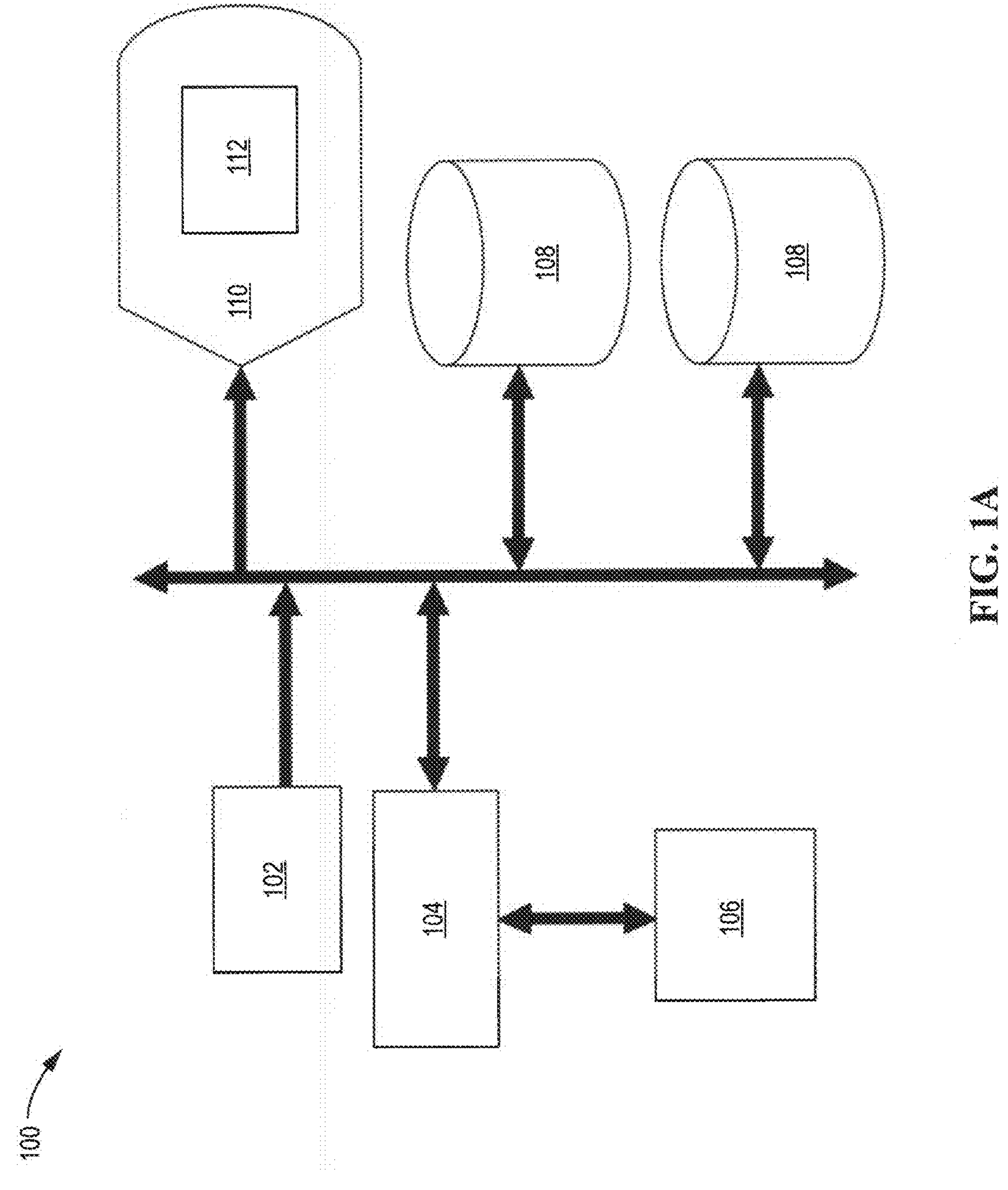
FIGS. 1A-1B illustrate an exemplary system architecture configured in accordance with an embodiment of the present invention.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

Generally, in an embodiment, the present invention provides a system and method that allow users to preview their billboard advertisements and artwork in a selected billboard location from the moving perspective of passersby. In an embodiment, a virtual environment depicting a particular billboard at a specific location can be displayed and automatically updated from a passerby's perspective in real-time. The present invention can be configured as a software application and implemented on various computer systems including desktop and laptop computers, networked computer and communication systems, and mobile devices.

The present invention can be utilized by users to obtain a more realistic depiction of their billboard artwork and advertisements than would otherwise be available by, for instance, viewing a static document (e.g., PDF, Word, JPEG) with the artwork. In other words, the present invention provides billboard simulation and assessment system and method thereof. The depiction provided by the present invention can include aspects of size and scale of the billboard in relation to elements of the environment, and the displayed depiction can be automatically updated in real-time based on speed, location, and viewing angles of passersby. This allows users to preview and more accurately assess whether the artwork and advertisements on a target billboard will appear as expected to passersby (e.g., consumers).

Referring to FIG. 1A, an exemplary system architecture 100 can include at least one processor 104 (e.g., microprocessor) communicatively coupled to an input device 102 (e.g., keyboard, mouse), a memory 106 or non-transitory computer readable storage medium, at least one database or data storage device 108, and a display 110. The processor 104 can be configured to execute computer readable instructions stored in the memory 106. A website or other graphical user interface (GUI) 112 can be included on the display 110 for user interaction. All of the above can be implemented in client device 140 and communicated to a server 120 as will be discussed in more detail below.

In an embodiment, users can upload artwork and advertisements (e.g., words, images, videos) and a location of a billboard via the input device 102 and the website/GUI 112 shown on display 110. The processor 104 can store or retrieve the uploaded artwork from database 108. In an embodiment, the system can be configured to include two user-selectable modes of operation, a virtual image mode and an actual image mode, both of which will be discussed in more detail below. A user can select one or both modes of operation to visualize the billboard artwork and advertisements in a selected environment and location. Based on the user's mode selection, in an embodiment, the processor 104 can (1) generate and display a dynamic virtual environment (created from prebuilt graphical components stored in database 108) depicting the selected location and billboard with artwork; or (2) retrieve actual images (e.g., Google® SDK maps, Google® Street view images) of the location and billboard from the database 108 and display the location with superimposed billboard artwork on the website/GUI 112 via the display 110.

Figure 1B:
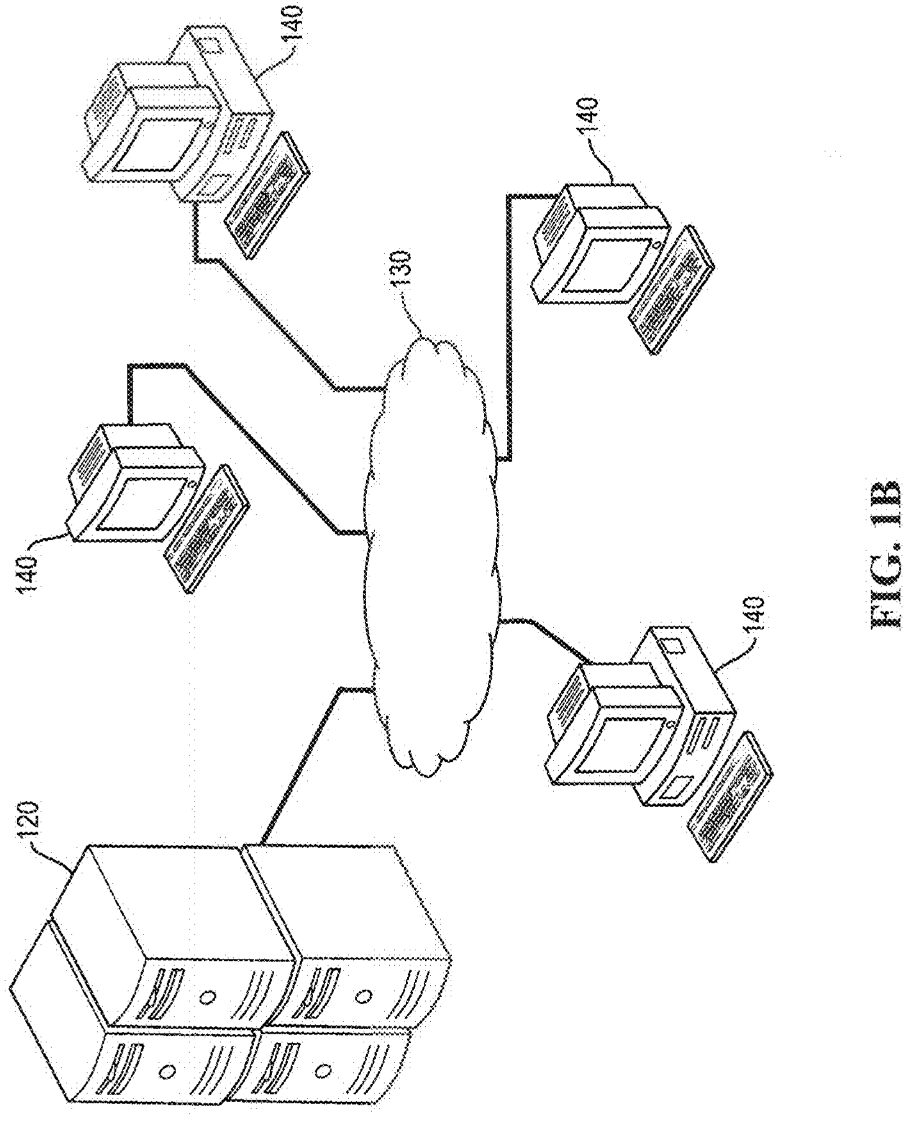

Referring to FIG. 1B, the system architecture 100 may be implemented in one or more servers 120 which communicate with a distributed computer network 130 via communication channels, whether wired or wireless, as is well known to those of ordinary skill in the pertinent art. In one embodiment, the distributed computer network 130 is the Internet. For simplicity, although a plurality of servers 120 are shown, the term server 120 applies well to the grouping as such computing power is well-known to be aggregated. Server 120 hosts multiple websites and houses multiple databases necessary for the proper operation of the billboard simulation and assessment system and methods in accordance with the subject technology.

The server 120 can be any of a number of servers known to those skilled in the art that are intended to be operably connected to a network so as to operably link to a plurality of clients or user computers 140 via the distributed computer network 130. The plurality of computers or clients 140 may be desktop computers, laptop computers, personal digital assistants, tablet computers, scanner devices, cellular telephones and the like. The clients or user computers 140 allow users to enter and access information on the server 120. For simplicity, only four clients or user computers 140 are shown but the number and location can be unlimited. The clients or user computers 140 have displays 110, GUI's and input devices 102 similar to those described above, among other components/equipment, as would be appreciated by those of ordinary skill in the pertinent art and will not be elaborated further herein.

It is understood that each of the devices 120, 140 of the architecture 100 can include processor 104, memory 106, among other components, for storing executable code and other interconnected hardware to accomplish the functions and goals of the subject technology. Additionally, the hardware and software of the devices 120, 140 can be particularly configured and programmed to be particularly suitable for the purposes of the subject technology. For example, in the architecture 100, the servers 120 would store rules and program modules that can employ other rules (e.g., mapping rules engine and its components). The servers 120 would also receive, store and send the necessary information including, without limitation, a rules database, tables of code data, and tables of map modules and the like. The servers 120 and devices 140 may include particular user-features such as streets and buildings, whether virtual or real, that are specific to accomplish an aspect of the subject technology.

The process disclosed herein may be embodied in computer program software for execution on a computer, digital processor, microprocessor, generic devices 120, 140, and/or uniquely tailored devices 120, 140 in the architecture 100. Those skilled in the art will appreciate that the process may include logic circuits on an integrated circuit that function according to the inventive technology. As such, the present technology may be practiced by a machine component that renders the program code elements in a form that instructs a digital processing apparatus (e.g., computer or hardware device) to perform a sequence of functional steps similar to or corresponding to those shown in the flow charts disclosed herein.

Figure 2:
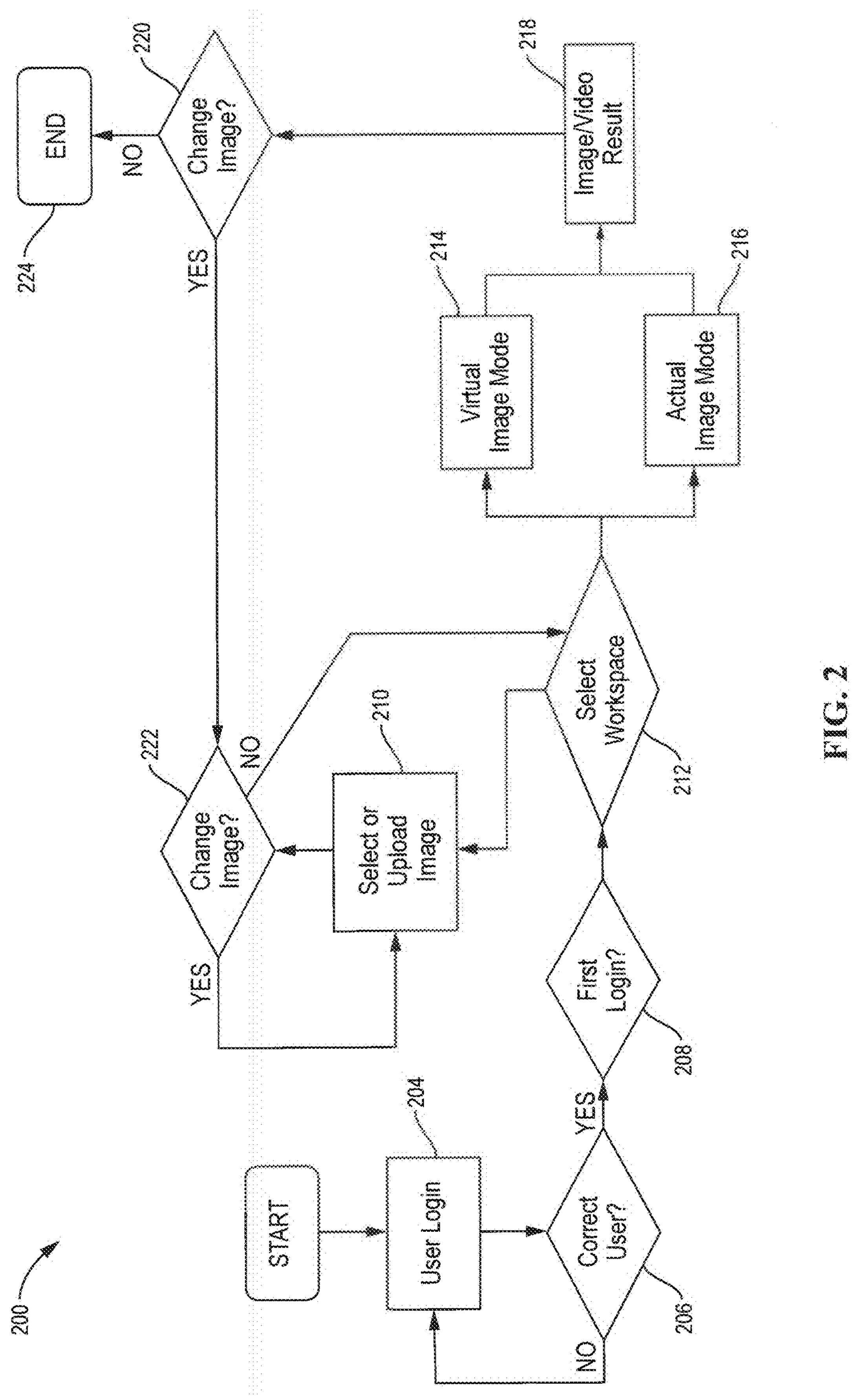
FIG. 2 is a flow diagram illustrating runtime operation of an exemplary embodiment of the present invention.

Referring to FIG. 2, an exemplary runtime operation of the system 200 can include a user login process in steps 204-208 during which the user provides a username and password via the website/GUI 112. In step 204, a user can log onto the system 200 via a suitable user interface (see FIG. 5A). Once authenticated, in step 206, the user can be logged into the system 200. If the user cannot be authenticated (e.g., incorrect username and/or password), the user will be redirected to the initial user interface in step 204 to register an account to access the system 200. In step 208, the system 200 may recognize if this is the first time that the user has accessed the system 200. If this is the user's first time accessing the system, there will not be anything saved on the system 200. In other words, there will not be any pre-stored images or videos uploaded to the system 200 from the user. In the alternative, the system 200 may recognize that this is not the user's first time accessing the system 200 and that the user may have uploaded or pre-stored images or videos on the system 200.

In step 212, a mode selection process (e.g., workspace or environment) can be initiated by the processor 104, during which the user can select the virtual image mode 214 or actual image mode 216 that the processor 104 will implement to generate and display the environmental scene 218 depicting the location and billboard with selected artwork and advertisements. Based on the user's mode selection 212, the displayed scene 218 can be a virtual video format or static image format. Once the workspace or environment has been selected, the processor 104 can initiate a selection process 210 that prompts or provides the option to the user, via the GUI 112, to select artwork or advertisement images stored in the database 108, or to upload such images into the database 108. The system 200 can then allow the user to continue modifying 220 the scene 218 by changing images 222, selecting 210 other artworks, changing mode selection 212, etc. The user also has the option of terminating execution and exiting 224 the system. These features, among others, will be discussed in more detail below.

Actual Image Mode

The actual image mode 216 utilizes actual photos or images, obtained from sources such as Google® Street View, that enables the processor 104 to generate a three-dimensional (3D) representation (e.g., cube map) of a selected location with the user's billboard and artwork displayed within the 3D representation. In various embodiments, options can be included for automatically and/or manually manipulating position, height, distance, and rotation of the 3D representation with respect to the camera position (i.e., passerby position). These features, among others, will be discussed in more detail below.

Figure 3:
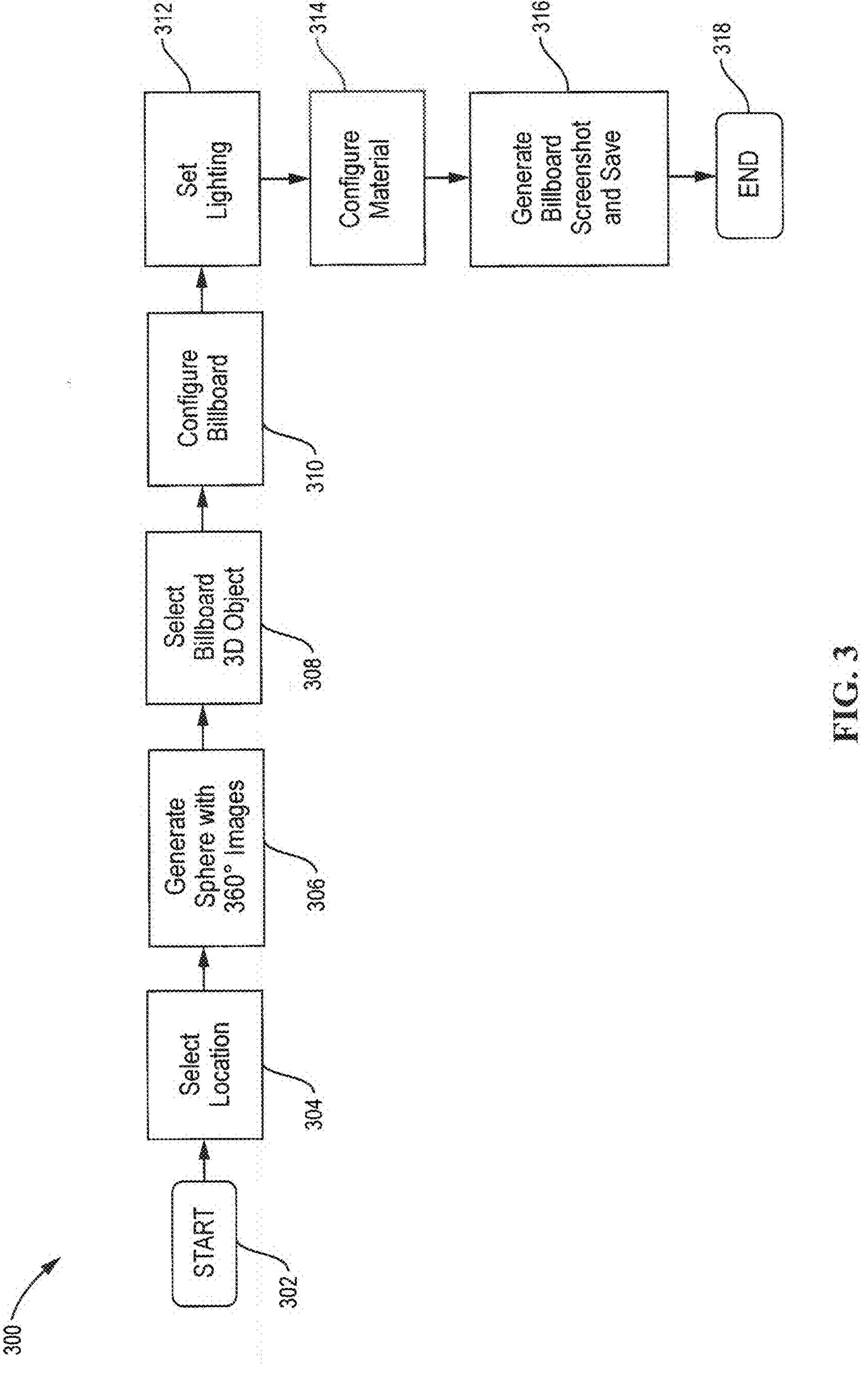
FIG. 3 is a flow diagram illustrating an aspect of the present invention.

Referring to FIG. 3, a flow diagram of an exemplary operation of actual image mode 300 is depicted. Upon the user's selection of actual image mode 300, the processor 104 initiates a select location process 304 and prompts or provides the user with the option to identify a specific location via the website/GUI 112. The location can be entered or captured by various means including typing an address into the GUI 112, obtaining the address by clicking on a map (e.g., Google® Maps), or entering latitude-longitude coordinates. Once the address of a particular location is captured, the processor 104 can retrieve and process actual photos/images of the location from the database 108 and generate a 3D representation 306 of the location. The selected location can include at least one billboard shown in the actual photos/images. The billboard may be free-standing on a pole, positioned on a side of a building, or on a rooftop, etc. In an embodiment, the images in the database 108 can be obtained from Google® Street View or similar source. In step 308, the processor 104 can implement the artwork and advertisements onto the billboard image. In step 310, the processor 104 configures the billboard's set angle, position, opacity, and size. In step 312, the processor 104 can set angle and intensity of light reflected on the billboard image. In step 314, the processor 104 configures the artwork, advertisements and other material included on the billboard image. In step 316, the finalized billboard image can be saved in the database 108 by processor 104. These features, among others, will be discussed in more detail below.

Virtual Image Mode

The virtual image mode 214 provides users with a traversable virtual environment simulating a particular location in the form of a time-lapse or travel video format. The processor 104 can create a virtual environment from editable graphical components stored in database 108. In an embodiment, the graphical components can also be selected by a user at runtime. The generated environmental scene 218 can be edited, automatically or manually, to include a billboard having the user's selected artwork and advertisements. In various embodiments, options can be included for automatically and/or manually manipulating the virtual environment features including location features, road design, billboard style, time of day, weather conditions, obstructions, traveling speed, and vantage point of the user (i.e., passerby position). These features, among others, will be discussed in more detail below.

Figure 4:
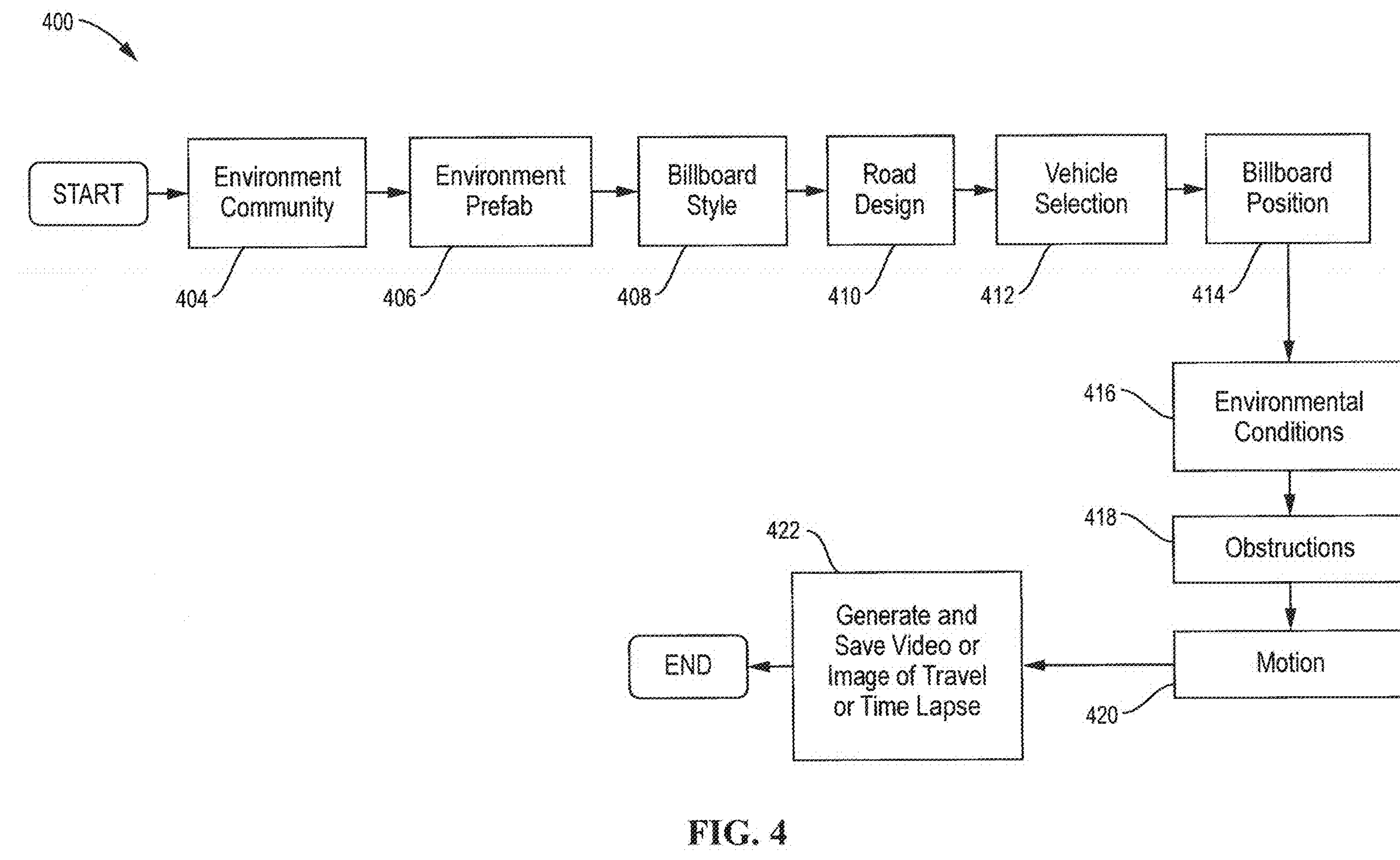
FIG. 4 is a flow diagram illustrating another aspect of the present invention.

Referring to FIG. 4, in an embodiment, a virtual image mode 400 can be configured to include various steps and optional features. Upon the user's selection of virtual image mode, the processor 104 can randomly generate a virtual environment from components stored in database 108, or alternatively generate the virtual environment based on stored user preferences or user selection at runtime. In step 404, the processor 104 can generate the virtual environment's community or location features, such as, a rural, urban, highway setting. In step 406, the processor 104 can retrieve editable graphical components from the database 108 and generate features, such as, buildings, neighborhoods, towns, etc. In step 408, the processor 104 selects and generates a physical style or type of billboard (e.g., free standing on a pole, positioned on side of building, on rooftop). In step 410, the processor 104 can generate road features, such as highways, secondary roads, number of lanes, straight roads, left and right turns with angle adjustments, uphill or downhill with percentage grade, etc. In step 412, the processor 104 can adjust the perceived user's vantage point based on whether the user (i.e., passerby) is walking past the billboard, or on a motorcycle, or in a compact car, sedan, or sport utility vehicle. In step 414, the processor 104 generates the billboard's position including size, set angle in relation to road, left side of road, right side of road, height of the billboard above the ground, opacity, and distance from a road.

Next, in step 416, the processor 104 can modify the virtual environment to indicate weather conditions (e.g., sunny, cloudy, rain, snow), time of day (e.g., day, night), and sun position and sunlight intensity relative to the billboard position in the virtual environment and user's vantage point of the billboard. In step 418, the processor 104 can select and set obstructions, such as, trees (with and without leaves), telephone and electrical poles, electrical wires, or road signs. In step 420, the processor 104 can set the perceived traveling speed based on the user's vantage point. In step 422, the processor 104 generates a time-lapse video or traveling video of the virtual environment, displays the video on the display 110, and saves a copy in the database 108. These features, among others, will be discussed in more detail below.

While the above steps 408 to 420 have been described in a particular order, it will be appreciated that in other embodiments the orders of these steps can vary. For example, step 408 can take place between steps 412 and 414, step 412 can take place between steps 418 and 420, and so forth.

In an embodiment, the displayed video can be from the user's vantage point of sitting in the selected vehicle and driving through the virtual environment in view of the billboard. Perceived traveling speed can be controlled by the user at runtime. The time lapse video can provide the user with a view of what impact, if any, the position of the sun will have on passersby during optimal viewing times. For example, billboards get the greatest viewing exposure during morning and afternoon hours of the work commute. If the travel direction is east and the billboard is positioned so that it faces west, the passersby view will be obscured by the sun at its optimal viewing time. These features, among others, will be discussed in more detail below.

Figure 5A:
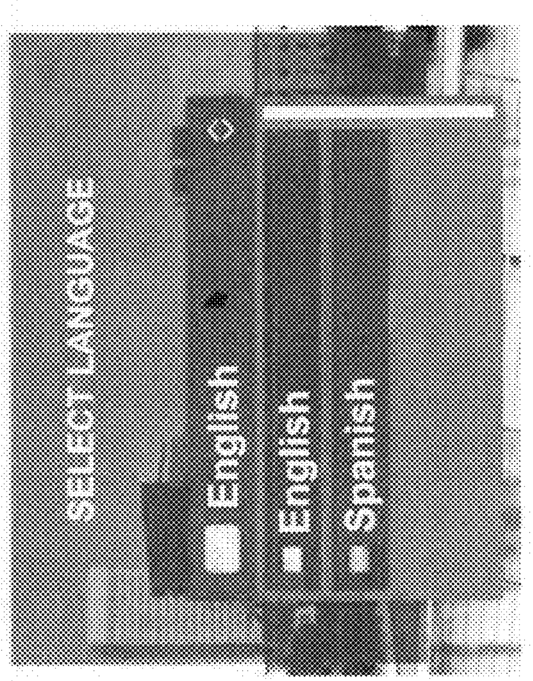
FIGS. 5A-5B illustrate a user login process.
Figure 5B:
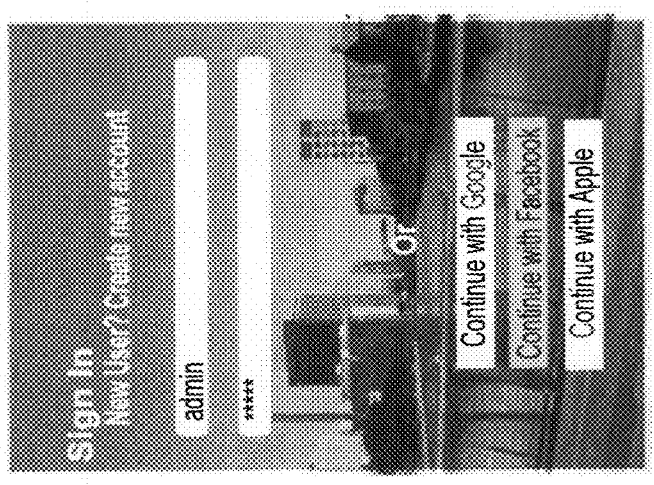
Figure 6B:
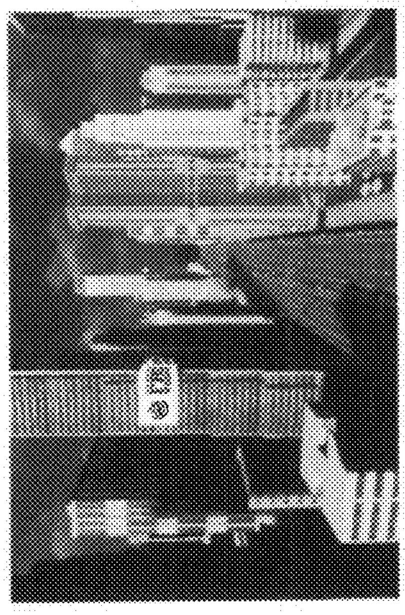
FIG. 6 is an illustration of a mode selection process between virtual image mode or actual image mode.
Figure 6B:
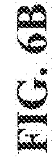
Figure 6A:
Figure 6A:
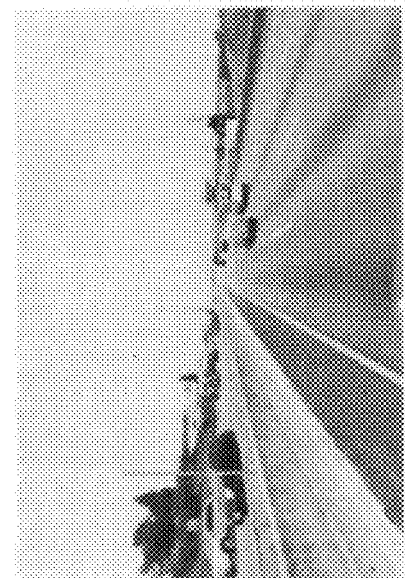

FIGS. 5A-5B illustrate a user login process 204 of an exemplary system 100 showing that the system 100 can be provided in different languages (e.g., English, Spanish) and in which a user can access the system 100 by creating a new account or use an existing email or social media account (e.g., Google®, Facebook®).

Disclosed is an embodiment of a system 100 for simulating and previewing billboards in selected environments on computer platforms, the system including a memory 106, a display 110, at least one database 108, and at least one processor 104 communicatively coupled to the memory 106, the display 110, and the at least one database 108. In operation, the processor 104 is configured to execute computer readable instructions stored in the memory 106 to perform various operations including accessing graphical data and at least one advertisement 500A, 500B from the at least one database 108 (best illustrated in FIG. 12 and will be discussed in more detail below). As discussed above in FIG. 2, the processor 104 can initiate a selection process 210 that prompts or provides the option to the user, via the GUI 112, to select artwork or advertisement images 500A, 500B stored in the database 108, or to upload such images into the database 108. In some embodiments, the advertisement 500A, 500B may contain alphabets, numbers, words, symbols, images, graphics and videos.

Next, the processor 104 can be configured to execute computer readable instructions stored in the memory 106 to generate on the display 110 a three-dimensional (3D) moving representation of an environment having a billboard displaying the advertisement (best illustrated in FIGS. 16A-16H and will be discussed in more detail below). In these instances, visualization of the billboard in the environment corresponds to a user's vantage point. And as the user's vantage point changes (e.g., car moving forward on the road, pedestrian walking on the street), the 3D representation of the environment can be continuously updated, and dynamic videos or static images of the 3D representation can be created and generated and stored in the memory 106 to generated 3D moving representations of the environment. These features, among others, will be discussed in more detail below.

FIG. 6 is an illustration of a mode selection process 212 between virtual image mode 214, 400 or actual image mode 216, 300, which the processor 104 will generate and display in an environment depicting the location and billboard with selected artwork and advertisements. In some embodiments, the simulated environment can be in virtual image mode 214, 400 or in actual image mode 216, 300.

The actual image mode 216, 300 can include actual photos or images, obtained from existing sources as discussed above (or subsequently created and imported) and as best illustrated on the left side of FIG. 6 showing an actual 360° snapshot of a highway. The location of the highway can be selected using a physical address or latitude or longitude coordinates or dropped using a pin onto a map. Ultimately, the idea is to be able to simulate placement of the billboard to resemble how the advertisement would appear to a viewer in the real world.

The virtual image mode 214, 400, as best illustrated on the right side of FIG. 6, can be a fully generated virtual world that is a simulation of made-up locations (e.g., metaverse), which can be fully customized to allow a user to navigate through a network of three-dimensional (3D) realistic environment with a user's vantage view of being in a vehicle, among other views such as being a pedestrian on a sidewalk. Like above, the idea is to be able to simulate placement of the billboard so as to give a viewer an idea how the advertisement would appear in such virtual world.

While the two modes (virtual and actual) are discussed as discrete modes, it is understood that elements (e.g., data-block of images, photos, graphical components for generating features such as cars, roads and buildings) from one mode may be interchangeably used in the other. In other words, elements from the virtual image mode 214, 400 may be incorporated into the actual image mode 216, 300, and vice versa, as can be appreciated by one skilled in the art. In addition, the elements, whether obtained from existing sources or created and subsequently imported, may be pre-stored in the databases 108 or uploaded to the databases 108, by the user or from other sources.

FIG. 7 is an illustration of a virtual image mode 400 in accordance with an aspect of the present invention. As discussed above, upon user's selection of the virtual image mode 400, the processor 104 can randomly generate a virtual environment from components stored in the database 108, or alternatively generate a virtual environment based on stored user preference at runtime. As shown, the user is presented with three different virtual communities: city 1404A, highway 1404B and rural 1404C. While three virtual communities are shown, it is understood that there can be more than three virtual communities or environments. In other words, additional settings, locations and features can made available in the virtual image mode 400. In some embodiments, while the environments 1404A, 1404B, 1404C as shown in FIG. 7 are described in the virtual image mode 400, it is understood that similar environments may be described in the actual image mode 300.

Figure 8:
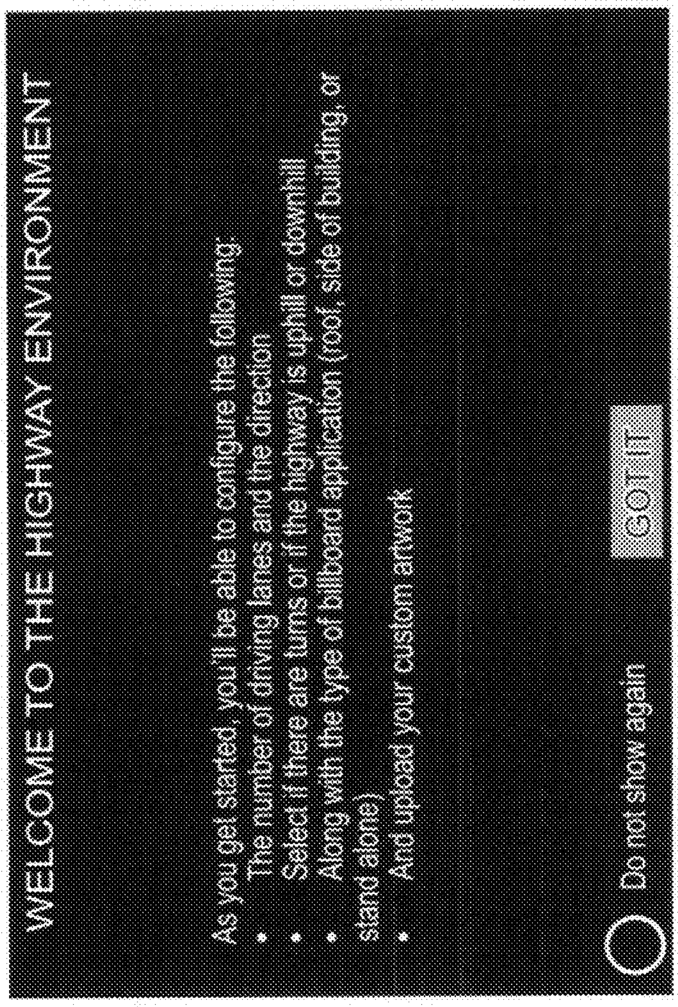
FIG. 8 is an illustration of the options that may be presented after a user has selected the highway setting in the virtual image mode.

FIG. 8 is an illustration of the non-exhaustive options that may be presented after a user has selected the highway setting 1404B in the virtual image mode 400. As shown, the user may be able to create a variety of virtual elements including the number of driving lanes and the directions of the lanes, whether there are turns in the lanes, and whether the highway will slope uphill or downhill. Additionally, the user will have the option of customizing the billboard for placement on the roof or side of a building, or as a standalone unit, similar to those discussed above. And finally, the user will be able to upload and/or customize artwork for the advertisement. In some embodiments, while the options as shown in FIG. 8 are described for the highway environment, it is understood that same or similar options may be presented for the other environments, namely, city and rural communities, among other settings.

Figure 9B:
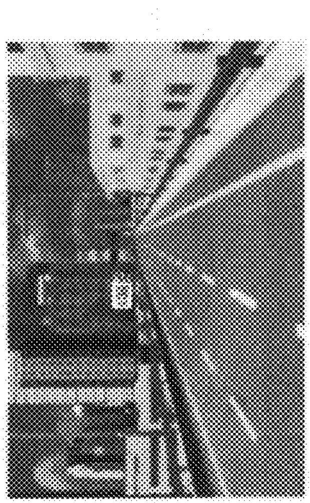
Figure 9B:
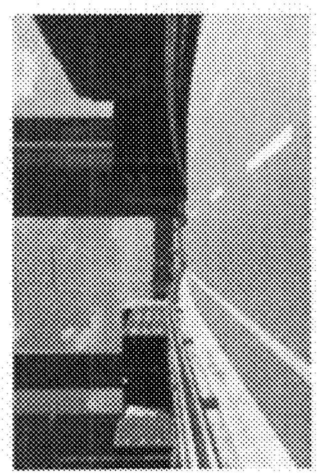
Figure 9B:
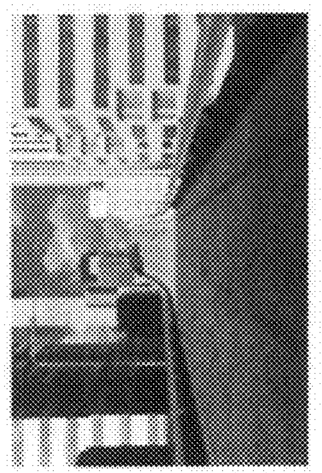

FIGS. 9A-9B are illustrations of the available roadway features 1408B. For example, the user may select roads with one, two or three or more lanes (not shown), roads without turns or with left and right turns (FIG. 9A), and straight roads, uphill or downhill roads with grades (FIG. 9B). In these instances, configuration of the roadway features 1408B will be part of the driving path for a user to visualize the design of the billboard on the side or top of the buildings.

Figure 10:
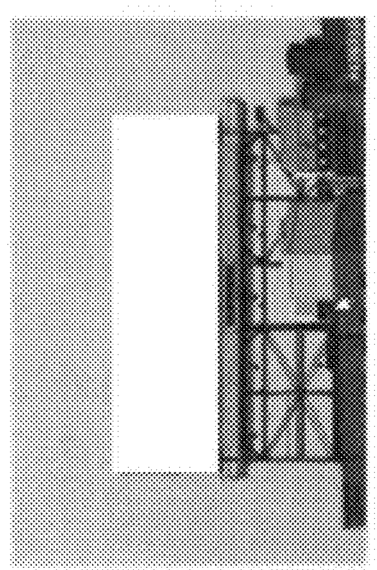
FIG. 10 is an illustration of the various billboard styles that may be available according to an aspect of the invention.
Figure 10:
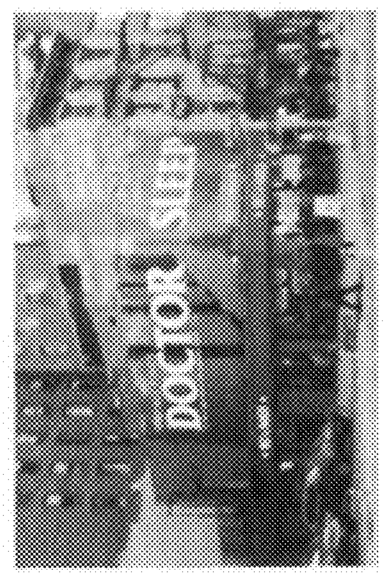
Figure 10:
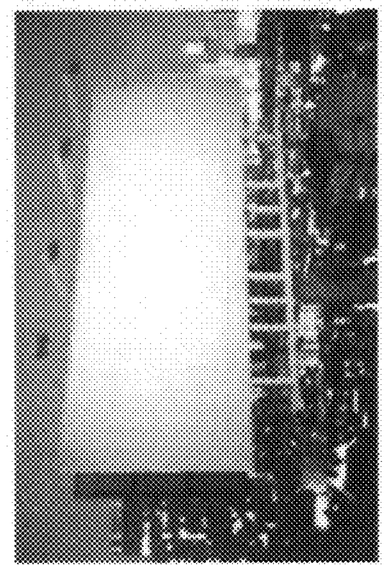
Figure 10:
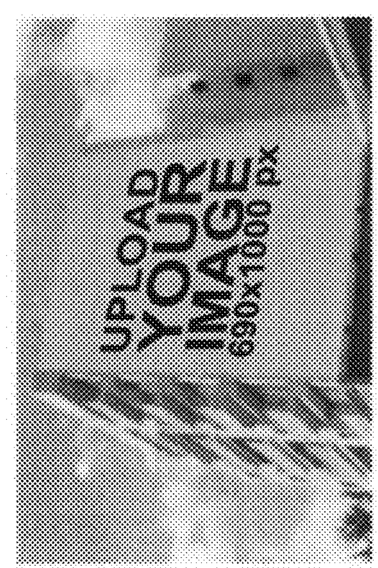
Figure 10:

FIG. 10 is an illustration of the various billboard styles 1410 that may be available according to an aspect of the invention. For example, the billboard 1410 may be situated on a free-standing pole (upper left), on a rooftop (upper right), on the side of a building (lower left), or on multiple sides of a building (lower right). It will be appreciated that the processor 104 may select and generate other types of billboard images 1410 for the visualization of the advertisement.

Figure 11:
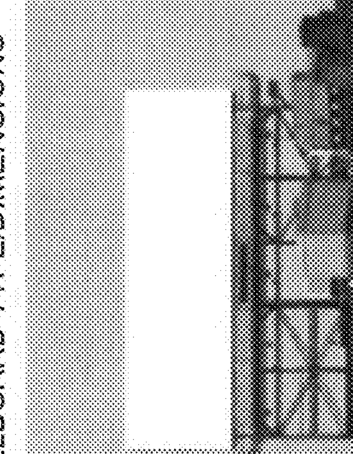
FIG. 11 is an illustration of billboard parameters that may be modified according to an aspect of the invention.
Figure 11:
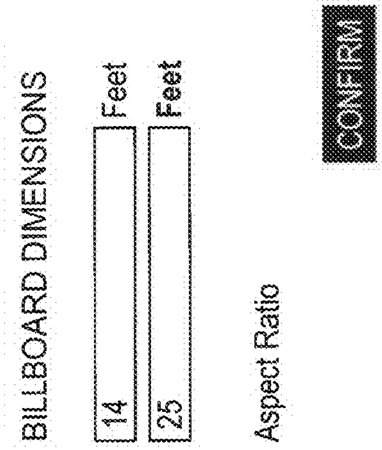

FIG. 11 is an illustration of billboard parameters 1412 that may be modified according to an aspect of the invention. As shown, the user may enter initial dimensions (e.g., length, width) of the billboard. In one aspect, the initial dimension should be the actual physical dimension of the billboard versus the dimension of the advertisement design although that need not be the case. The user can manipulate or modify the dimension as well as the aspect ratio, which can be automatically handled by the processor 104. The modified parameters 1412 of the billboard can be shown, in real-time, on the display 110 to the left of FIG. 11.

Figure 12:
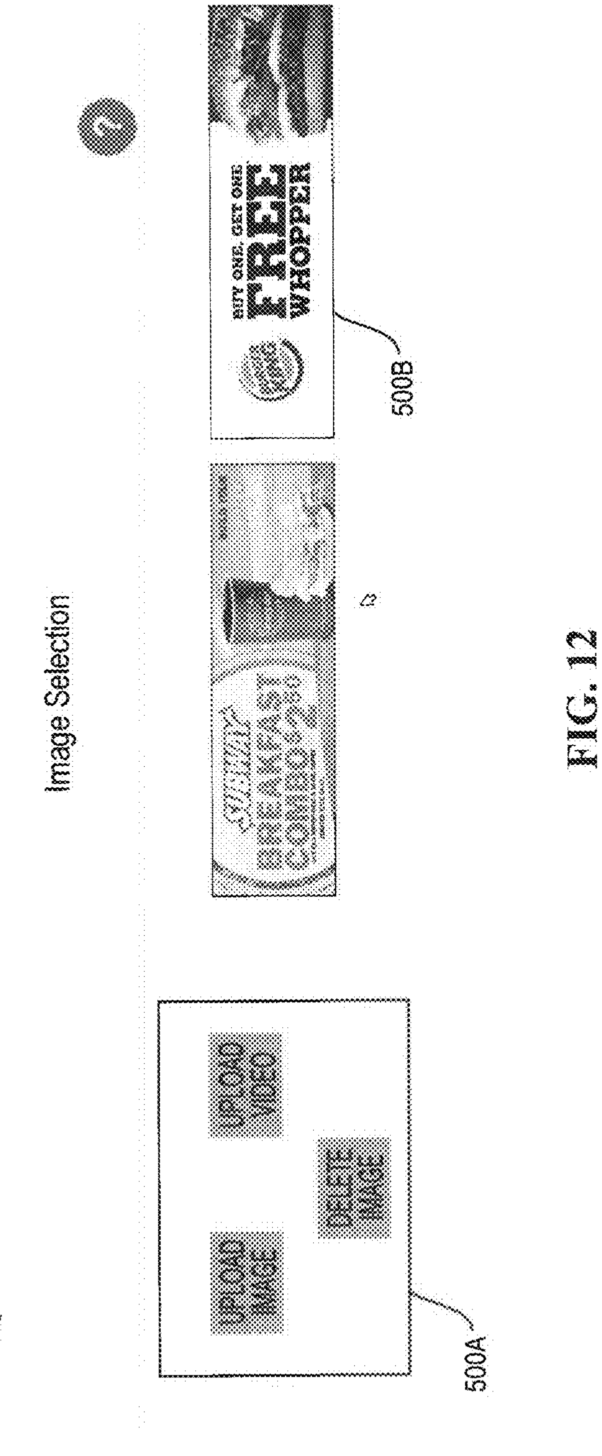
FIG. 12 is an illustration of a selection process for providing artwork or advertisement images.

FIG. 12 is an illustration of a selection process 210 for providing advertisement images or artwork 500, including videos, in the virtual image mode 400. In some embodiments, the advertisement 500A, 500B can include alphabets, numbers, words, symbols, images, graphics or videos. In one example, the advertisement 500A can be uploaded by the user. In another example, the advertisement 500B can be selected from existing graphical data in the database 108. The advertisement 500A can also include images or videos that are uploaded by the user and modified on the display 110 by the user via the processor 104. In some embodiments, parameters (e.g., font size, type, shape, speed of the video) of the advertisement 500 may be modified like those of the billboard as described above.

Figure 13:
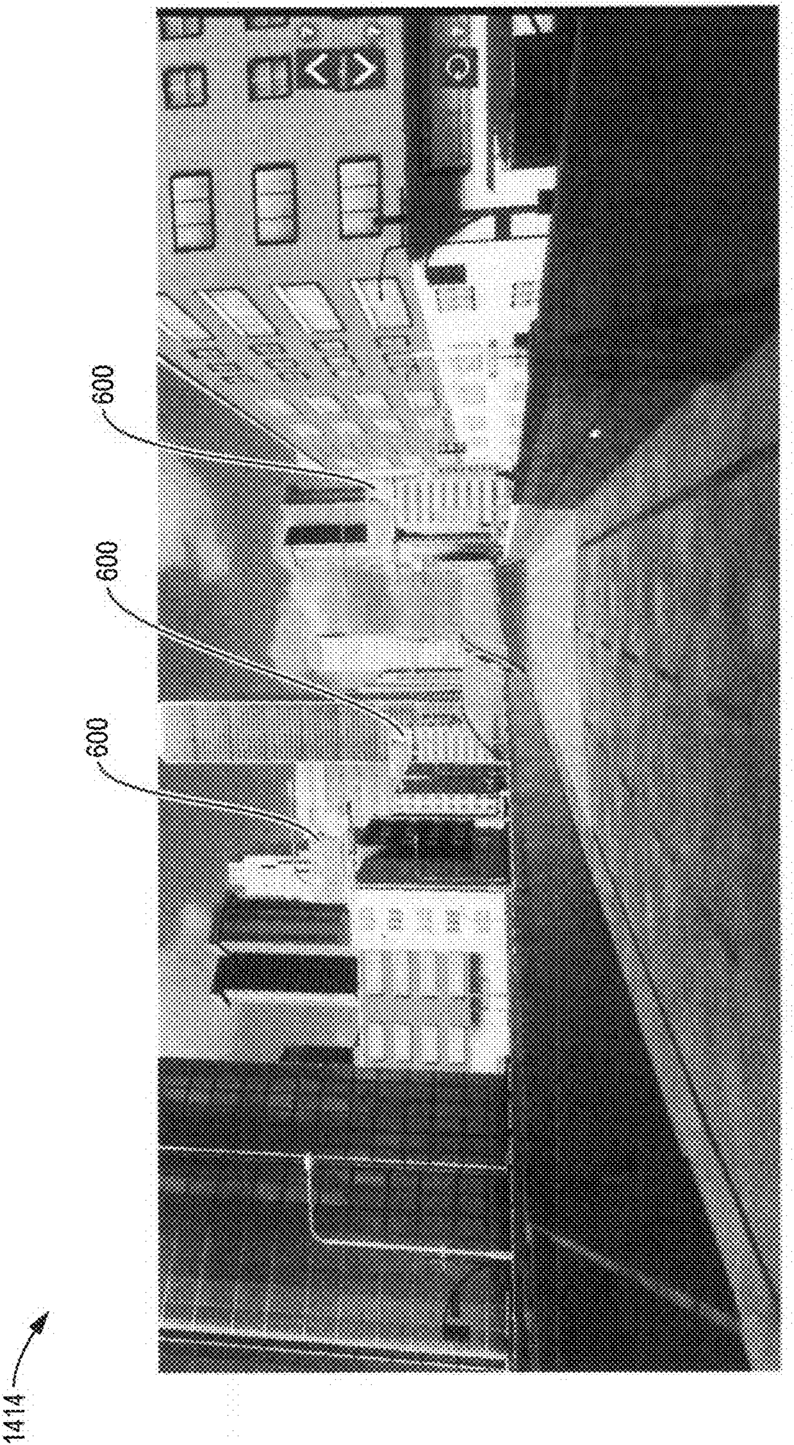
FIG. 13 is an illustration of a plurality of billboards displaying a plurality of advertisements in a highway setting.

FIG. 13 is an illustration of a plurality of advertisement billboards 600 in a highway setting 1414. In one embodiment, generated on the display 110 is a 3D representation of a virtual environment 1414 having a plurality of billboards displaying the user's selected plurality of artworks and advertisements 600. This generated environment 1414 can be edited, automatically or manually. For example, while three advertisement billboards 600 are shown, it will be appreciated that there can be more or fewer billboards 600. In some instances, the advertisement billboards 600 can be viewed from a user's vantage point of being in a vehicle on the road, whether driver or passenger. In other instances, the advertisement billboards 600 can be viewed from a different user's vantage point such as that of being a pedestrian on a sidewalk.

Figure 14A:
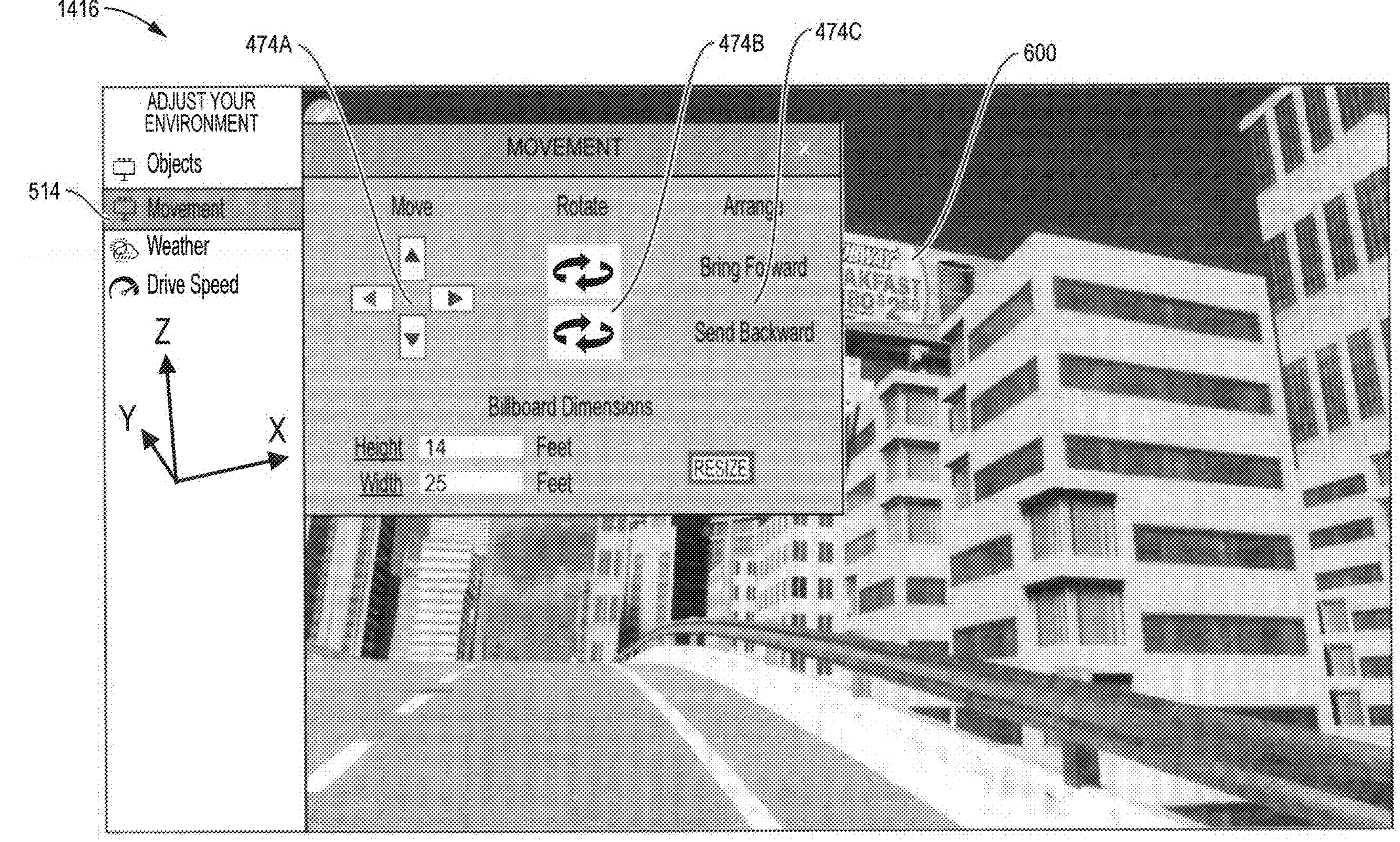
FIGS. 14A-14D illustrate the different environmental conditions of FIG. 13.
Figure 14B:
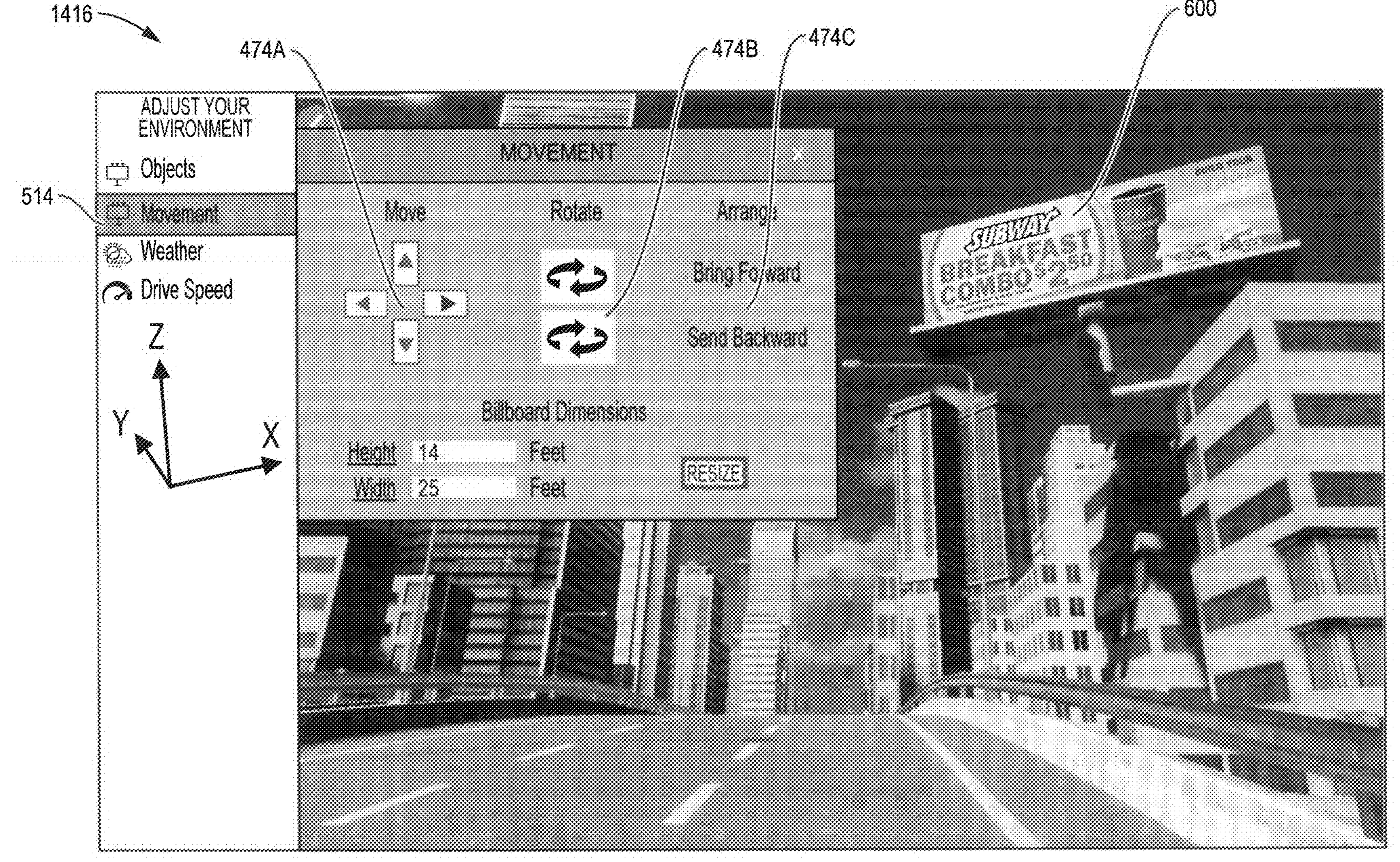
Figure 14C:
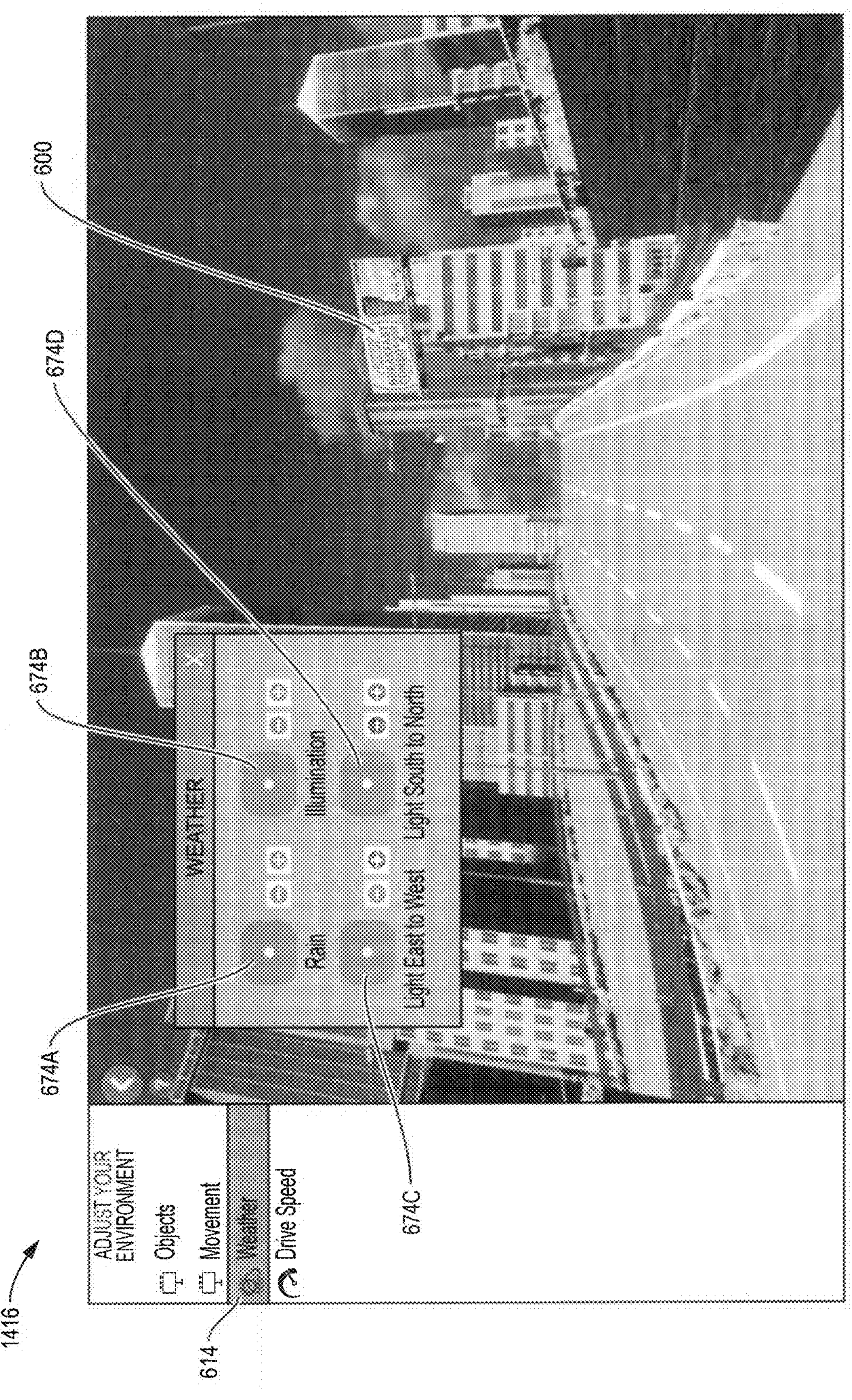
Figure 14D:
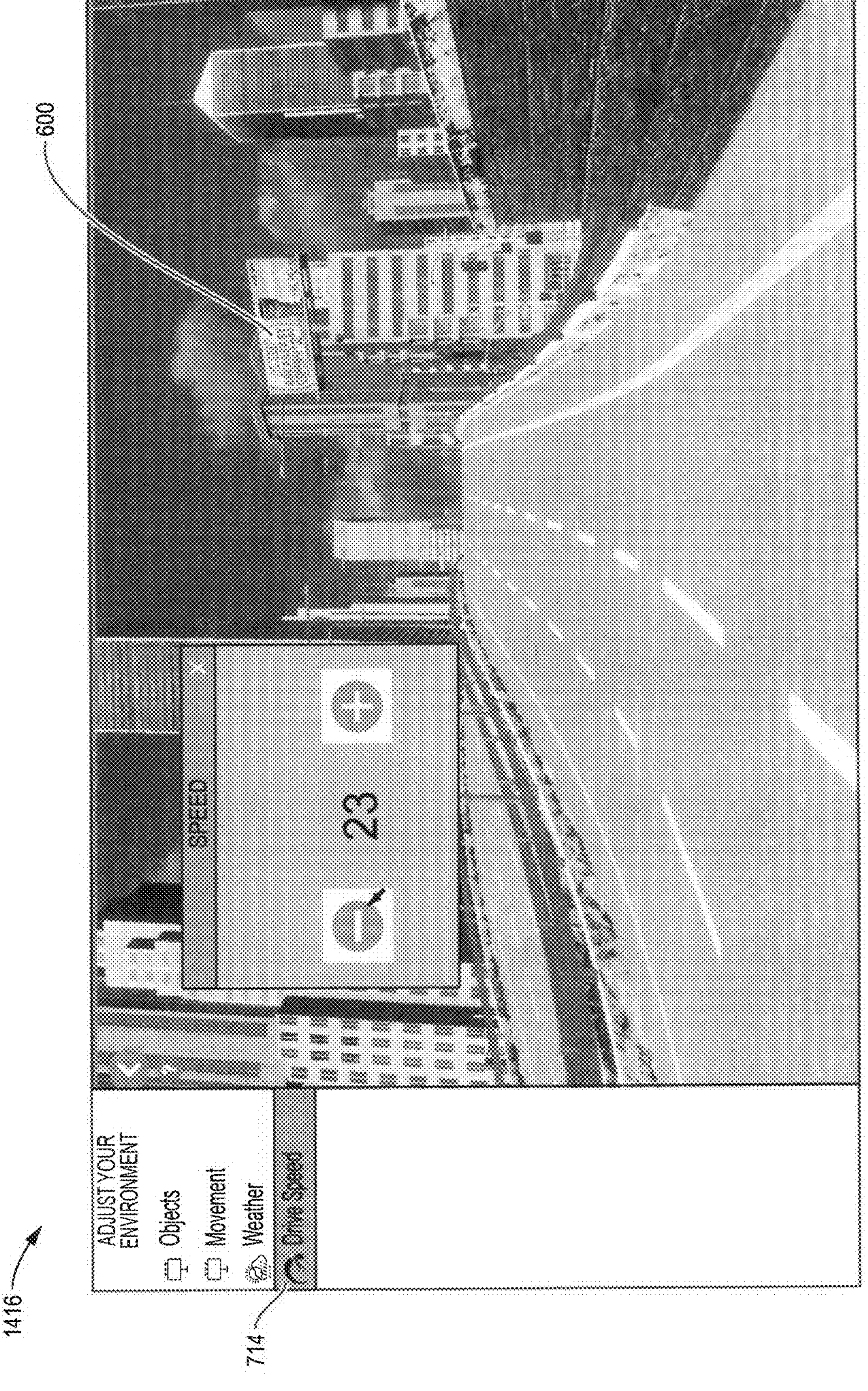

FIGS. 14A-14D illustrate the different environmental conditions 1416 of FIG. 13. FIGS. 14A-14B are directed to positioning of the billboards 600 within the environment 1416, FIG. 14C is directed to manipulating weather conditions within the environment 1416, and FIG. 14D is directed to manipulating the speed of the user's vantage point of being in a car on the road.

FIGS. 14A-14B illustrate how a user can manipulate the virtual environmental features including the positioning or movement of the billboard. For example, a user may manipulate the billboard's set angle in relation to the road, placement of the billboard to the left or right side of the road, height of the billboard above the ground, opacity of the billboard, and distance of the billboard from the road, among other orientations, positions or movements. In some embodiments, the environment 1416 includes a plurality of movement controls 514, which can include selection controls for movement 474A in the X- and Z-axes, positive and negative rotations 474B, and movement 474C in the Y-axis. The ability to manipulate the orientation, position or movement of the billboards 600 can best be seen by comparing the differences between FIGS. 14A and 14B in which the billboard 600 in the former figure appears normal facing forward and on top of a building while the billboard 600 in the latter figure is tilted outwardly toward the highway and exaggerated to be hovering in midair.

FIG. 14C illustrates how a user can modify another virtual environmental feature such as sensory stimuli of the environment including without limitation, weather conditions (e.g., sunny, cloudy, rain, snow), time of day (e.g., day, night), and sun position and sunlight intensity relative to the billboard position in the virtual environment and user's vantage point of the billboard. In some embodiments, the environment 1416 includes a plurality of weather controls

614, which can include selection controls for increasing or decreasing amount of rain 674A, increasing or decreasing amount of illumination 674B, increasing or decreasing amount of sunlight from East to West 674C, and increasing or decreasing amount of sunlight from South to North 674D. In some embodiments, the amount of rain 674A as well as illumination 674B can be dynamic such that the virtual environment 1416 can automatically display what the billboard 600 would look like with increasing or decreasing rain, as well as how illumination changes throughout the day, on an hour-by-hour basis or in 15-min intervals.

FIG. 14D illustrates how a user can control or modify yet another virtual environmental feature such as drive speed of a vehicle 714. In this instance, user's vantage point is determined to be from that of a vehicle (e.g., as either driver or passenger) traveling on the highway. In this embodiment, the vantage point of the user can be increased or decreased, by increasing or decreasing the travel speed of the vehicle 714. In some embodiments, the traveling speed 714 can be dynamic such that the speed is increasing, decreasing, or operating within a specified driving speed. By setting the driving speed of the vehicle 714 it allows the processor 104 to set a perceived traveling speed as determined from the user's vantage point.

In operation, the processor 104 can adjust a perceived user's vantage point based on whether the user is the driver of a vehicle (e.g., compact car, sedan, or sport utility vehicle), passenger of the vehicle, on a motorcycle, or the user (e.g., passerby) is walking past the billboard. In this embodiment, the perceived user is the driver of a vehicle. The processor 104 is able to subsequently generate a time-lapsed video or traveling video of the virtual environment 1416, display such time-lapsed video on the display 110, and/or save a copy of the time-lapsed video to the database 108. Alternatively, the processor 104 can also generate second-by-second or time-lapsed snapshots of static images of the virtual environment 1416, and display/save the same. This can best be seen in FIGS. 16A-16H and will be discussed further below.

In operation, the processor 104 is able to do this by taking multiple snapshots and updating the 3D representation of the environment 1416, hence, the 3D representation of the environment becomes a 3D moving representation of the environment 1416. In some embodiments, because the sensory stimuli of the environment 1416 can be altered as discussed above in FIGS. 14A-14D, the 3D moving representation of the environment 1416 can also be updated in response to the altered sensory stimuli. In other words, the processor 104 is able to create dynamic video formats and/or static image formats of the 3D moving representation of the environment 1416 with the billboard 600. Furthermore, as discussed herein, the dynamic video formats and/or static image formats can be displayed via wired or wireless communication to portable electronic devices such as mobile phones and smart headsets, including without limitation virtual reality and augmented reality smart glasses (e.g., AR/VR headsets).

Figure 15A:
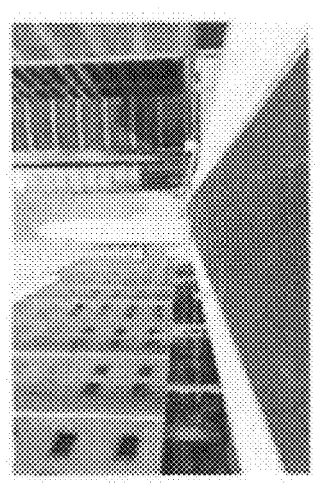
FIGS. 15A-15D illustrate a city setting in the virtual image mode.
Figure 15A:
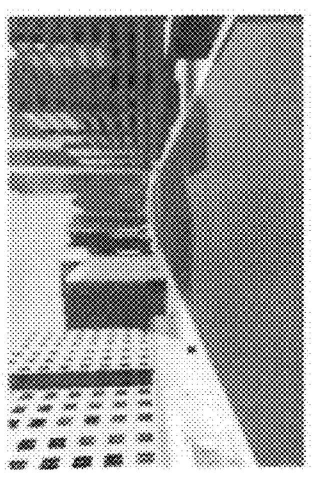
Figure 15A:
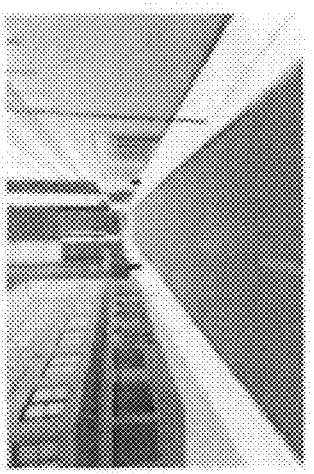
Figure 15A:
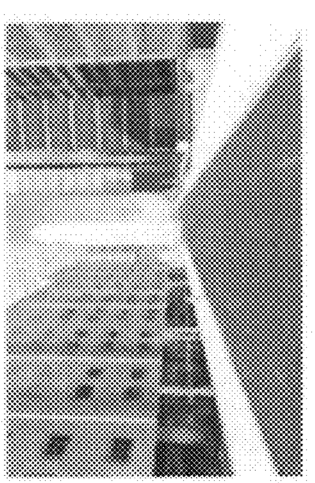
Figure 15A:
Figure 15B:
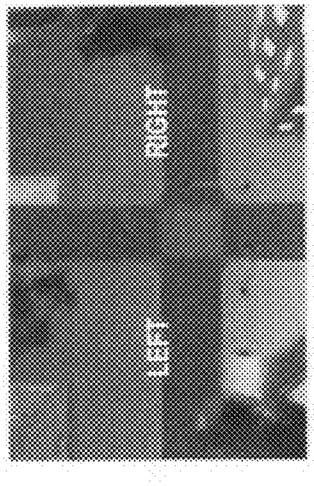
Figure 15B:
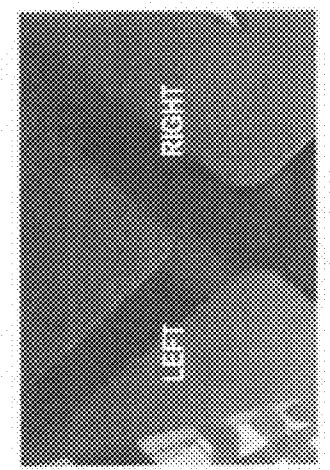
Figure 15B:
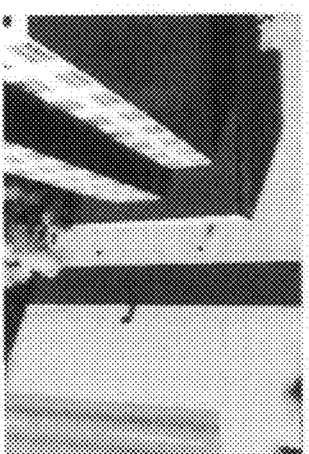
Figure 15B:
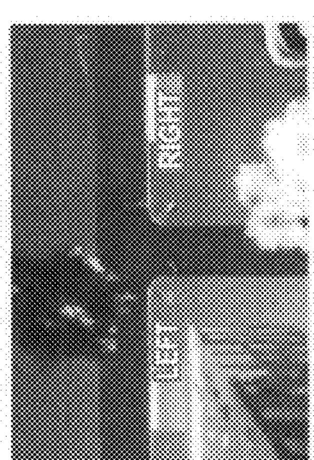
Figure 15C:
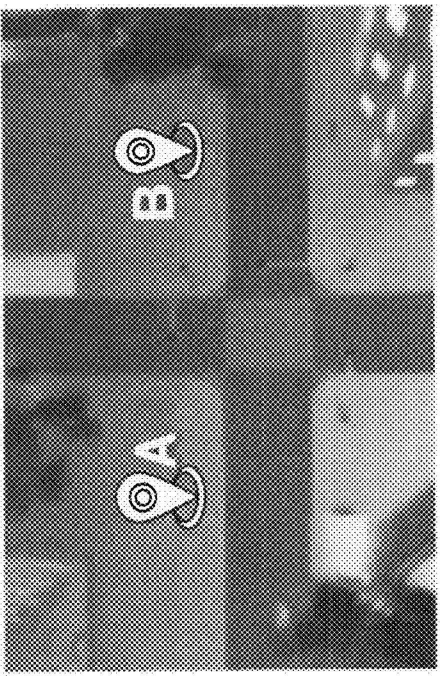
Figure 15D:
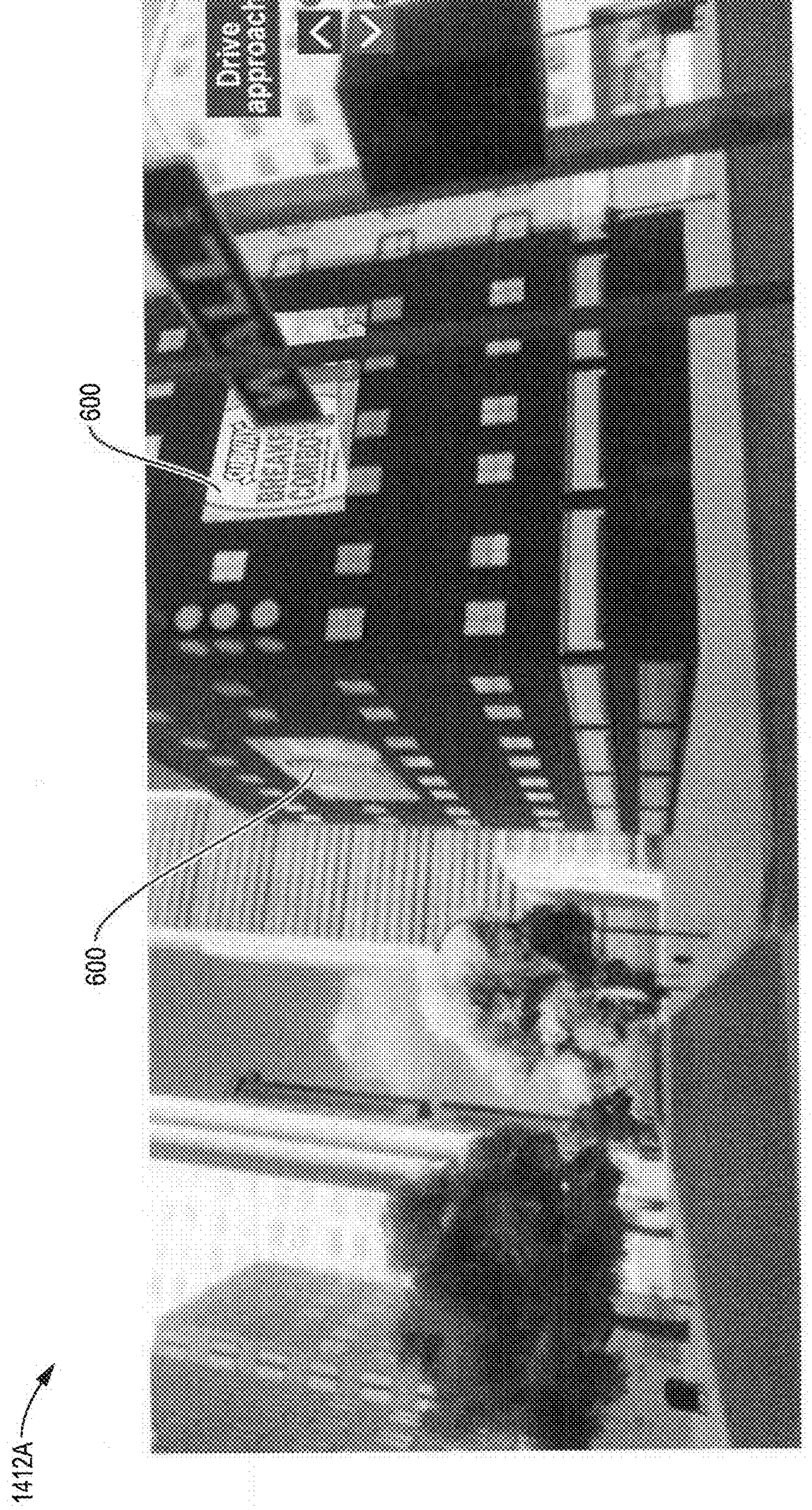

FIGS. 15A-15D illustrate a city setting 1404A similar to those of the highway setting 1404B as discussed in FIGS. 8-14, and generally describe the selection process of the road, location of the billboard in the intersection, as well as the movement or position of the billboard on the building itself. As shown in FIG. 15A, in the city setting 1404A, in a selection process of the road a user can choose the number of lanes in the city, for example, including one-way streets with different lane configurations (upper set) and two-way streets with various lane configurations (lower set), among other types of configurations (not shown). Similarly, as shown in FIG. 15B, in configuring the roadway features 1408A, the user can select the type of driving turns. For example, 4-way intersection with no turns (upper left), 4-way intersection with left/right turns (upper right), T-shaped 90° intersection with left/right turns (lower left), and 135° curve with left/right turn (lower right), among others. As can be understood, other lane and turn configurations can be implemented. FIGS. 15C and 15D are illustrations of modifying billboard parameters 1412A. As shown in FIG. 15C, the user can determine the location of the billboard in the intersection by placing the billboard 600 on the left or right side of the road/sidewalk. Next, the user can choose where to place the billboard 600 with respect to the building, or in this instance, on the side of the building as shown in FIG. 15D.

Figures 16A, 16B, 16C, 16D, 16E, 16F, 16G, 16H:
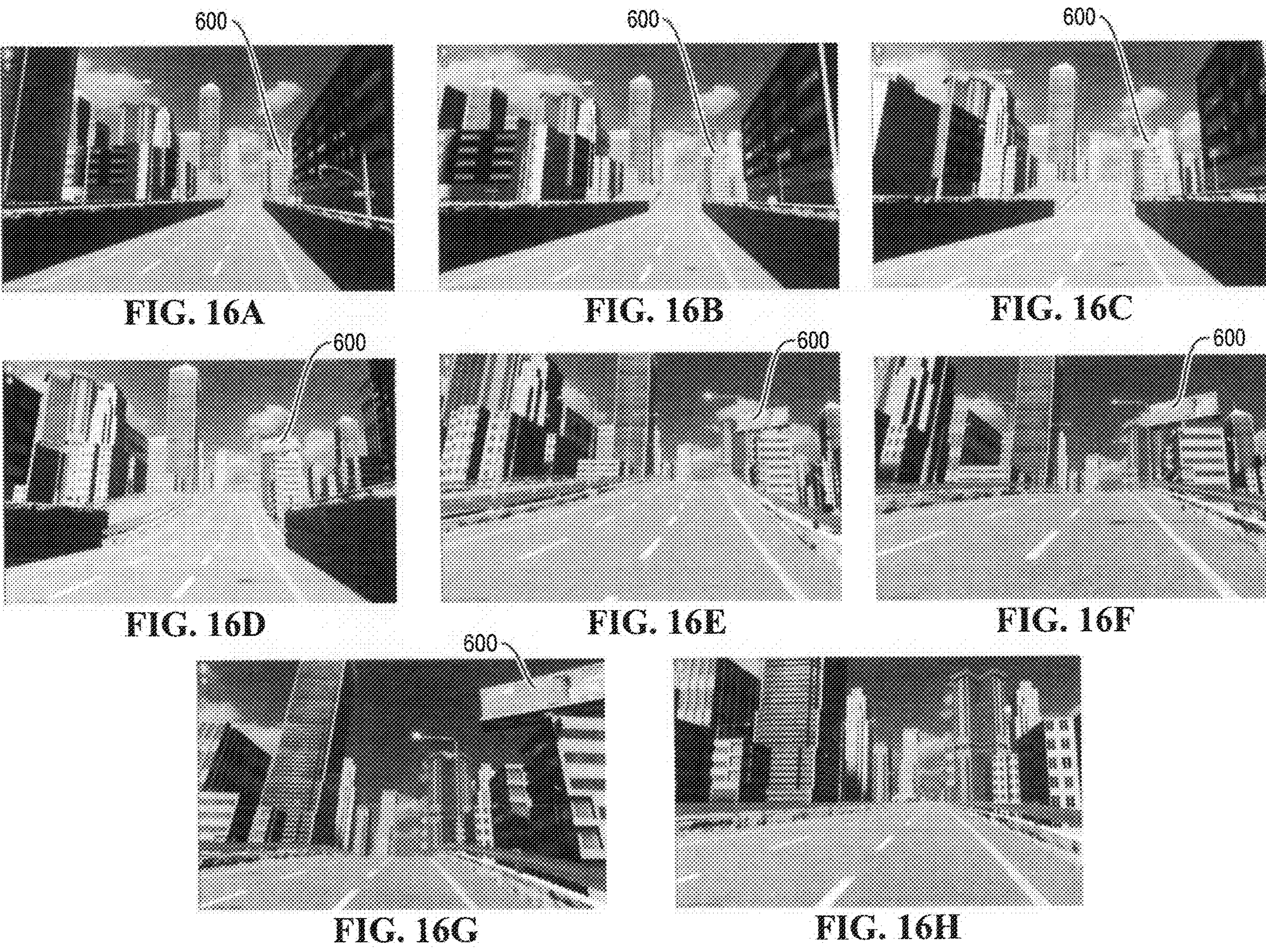
FIGS. 16A-16H are second-by-second snapshots of moving representation of a billboard in a highway setting in response to changes in a user's vantage point.

FIGS. 16A-16H are second-by-second snapshots of moving representation of a billboard 600 in a highway setting in response to changes in a user's vantage point. In this embodiment, the snapshots can be combined to create on the display 110 a video showing from a user's vantage point of sitting in a selected vehicle, such as a car, and driving through a virtual highway setting environment while viewing the billboard 600 as described in FIGS. 8-14. As can be seen in FIG. 16A, the billboard 600 initially appears far away to the driver. With each passing seconds in FIGS. 16B, 16C and 16D, the billboard 600 becomes closer and closer and more visible. As the vehicle is going uphill, the billboard 600 gradually becomes larger and more visible as can be seen in FIGS. 16E, 16F and 16G. Until the vehicle passes by and the billboard 600 is no longer visible as shown in FIG. 16H.

In operation, the second-by-second snapshots are created by movement of the user's vantage point. In one embodiment, for example, by the travel of the vehicle as discussed above. In this instance, movement can be created by a zoom function in combination with a pinpoint which creates the direction of the view when it zooms. For example, from FIG. 16A to FIG. 16B, a pinpoint may be created in the road indicating where the vehicle would travel to next, and a zoom function would be initiated to create the movement and subsequently the view from the user's vantage point at the next point-in-time where the vehicle would be (e.g., how the view would look like from the user's vantage point based on where the vehicle would be a second later). In other embodiments, the movement can be created by other suitable processes.

In one embodiment, the disclosed system provides a traversable virtual environment simulating a particular location in the form of a time-lapse or travel video format. In some embodiments, the processor 104 is further configured to create dynamic video format and static image format of the 3D moving representation of the environment and the billboard 600. As can be appreciated by one skilled in the art, although second-by-second snapshots are show in FIGS. 16A-16H as static images, these can be pieced together to create a continuous dynamic video to better simulate actual driving condition or actual changes in the user's vantage point.

Additionally, as shown in FIGS. 16A-16H, the 3D representation of the virtual environment having the billboard 600 displaying the advertisement starts off as a static image. In the initial instance, visualization of the billboard 600 in the environment corresponds to a user's vantage point of being in the vehicle. As the user's vantage point changes, e.g., as the car is moving along the road and uphill, the 3D representation of the environment is updated, e.g., FIGS.

16B, 16C, etc., to generate 3D moving representations of the environment. This continuous updating and dynamic movement of the 3D representation is changing as the user's vantage point changes. The result is the creation of a chain of pictures (e.g., static images) that can be rendered into a video and provide such video to simulate movements in a virtual environment that can be based off a real-world environment.

In some embodiments, the ability to simulate the environmental conditions as discussed above in FIGS. 14A-14D can provide tremendous cost savings to a user. For example, generating a time-lapsed video to provide a user with a view of what impact, if any, the position of the sun will have on passersby during optimal viewing times. Or for example, where or how to position the billboard to get the greatest viewing exposure during morning and afternoon hours of the work commute. And if the travel direction is east and the billboard is positioned so that it faces west, whether the passersby view will be obscured by the sun at its optimal viewing time.

It will be appreciated that while the above embodiments discussed in FIGS. 7-16 are mainly in virtual image mode 214, 400, similar learnings can be applied while in actual image mode 216, 300. One of the differences being that in the actual image mode 216, 300, the processor 104 is retrieving and processing photos/images of an actual location from the database 108 and generating a 3D representation 306 of such location. These actual photos/images can be from existing databases 108 such as Google® Street View or similar sources, or from the user. The disclosed systems and methods of modifying advertisements and billboards, including the environmental conditions, in the virtual image mode 214, 400 as discussed above, may similarly be utilized in the actual image mode 216, 300.

By way of example and in no way limiting, the disclosed systems and methods of modifying the billboard style 1410 as shown in FIG. 10 can be applied to step 310 of the actual image mode 216, modifications of the advertisement 1412 as shown in FIG. 11 can be applied to steps 308 and 314, and manipulation of the environmental conditions 1414 as shown in FIGS. 13-14 can be applied to step 312, to name a few.

Figure 17:
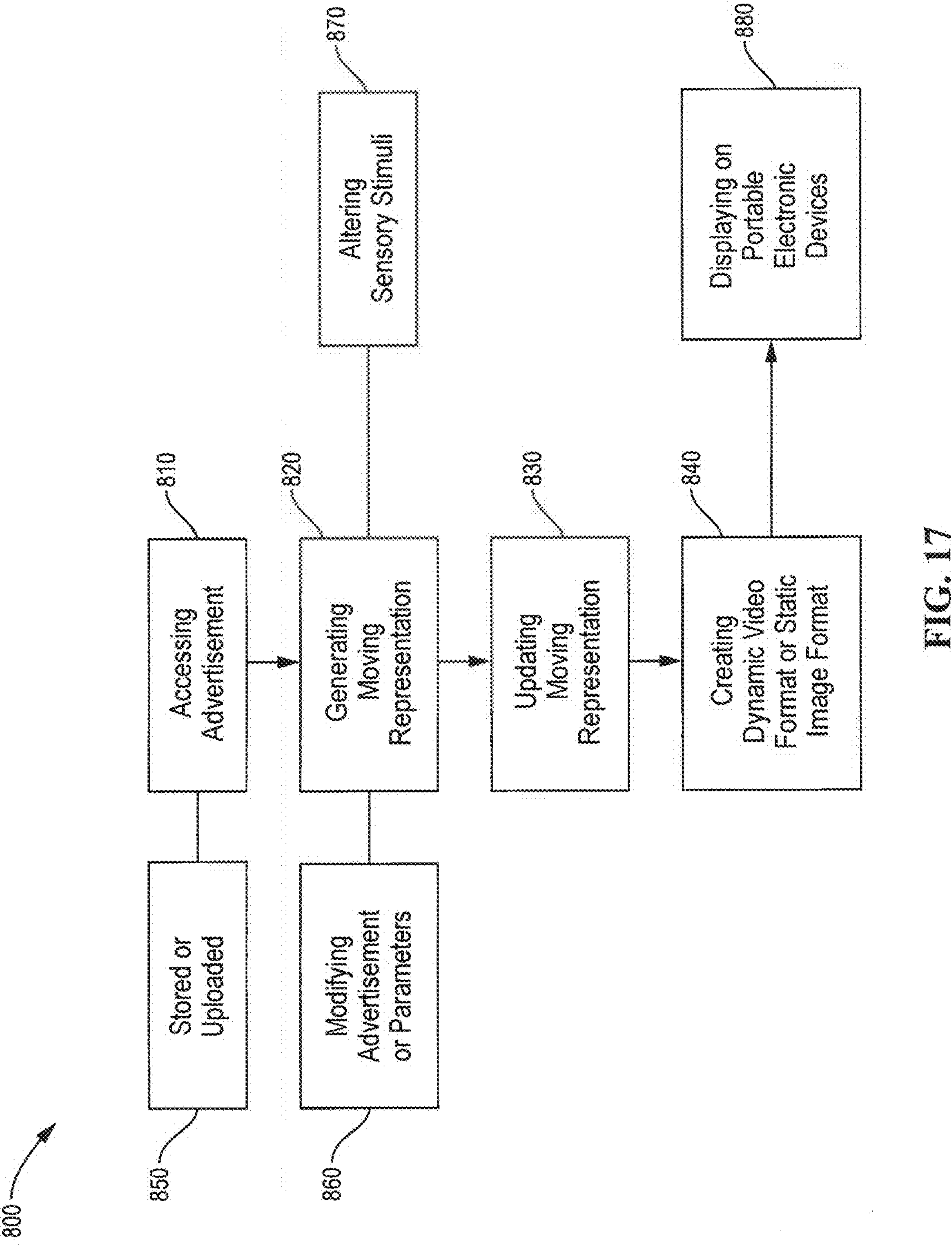
FIG. 17 is a flow diagram illustrating yet another aspect of the present invention.

FIG. 17 is a flow diagram 800 illustrating yet another aspect of the present invention. In some embodiments, a method 800 includes in a system 100 having at least one processor 104 communicatively coupled to a memory 106, a display 110, and at least one database 108, where the processor 104 is configured to execute computer readable instructions stored in the memory 106 to perform at least one of the following operations. In step 810, accessing, by the processor 104, of graphical data and at least one advertisement from the at least one database 108. In step 820, generating, by the processor 104, on the display 110 a three-dimensional (3D) moving representation of an environment having a billboard 600 displaying the at least one advertisement such that the visualization of the billboard 600 corresponds to a user's vantage point. In step 830, updating, by the processor 104, of the 3D moving representation of the environment and the billboard 600 in response to changes in the user's vantage point.

In one embodiment, the at least one advertisement includes at least one of alphabets, numbers, words, symbols, images, graphics and videos. In some embodiments, the environment can be in virtual image mode 214, 400 or actual image mode 216, 300. Optionally, in step 850, the environment includes elements that are already stored in or subsequently uploaded to the at least one database 108.

In one embodiment, in step 840, creating, by the processor 104, at least one of dynamic video format and static image format of the 3D moving representation of the environment and the billboard 600. Optionally, in another embodiment, the generating step 820 may also include a modifying step 860, by the processor 104, modifying parameters of the billboard 600 or the at least one advertisement.

In one embodiment, in step 870, the generating step 820 may also include an altering step 870, by the processor 104, altering on the display 110 the 3D moving representation of sensory stimuli of the environment. In this embodiment, the updating step 830 may subsequently include updating the 3D moving representation of the environment in response to the altered sensory stimuli of the environment from the altering step 870.

Next, the creating step 840 may subsequently include creating, by the processor 104, at least one of dynamic video format and static image format of the 3D moving representation of the environment and the billboard 600, to include updated 3D moving representation of the environment in response to the altered sensory stimuli of the environment from the altering step 870. In one embodiment, in a display step 880, on portable electronic devices including AR/VR headsets, the at least one of dynamic video format and static image format of the 3D moving representation of the environment and the billboard 600.

Configurations and Implementations

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

A tangible, non-transitory computer storage medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

In general, a machine-readable medium includes any mechanism that provides (i.e., stores and/or transmits) information in a form accessible by a machine (e.g., a computer, network device, personal digital assistant, manufacturing tool, any device with a set of one or more processors).

In various embodiments, hardwired circuitry may be used in combination with software instructions to implement the techniques. Thus, the techniques are neither limited to any specific combination of hardware circuitry and software nor to any particular source for the instructions executed by the data processing system.

While example embodiments have been particularly shown and described, it will be understood by those skilled in the art that various changes in form and details may be made therein without departing from the scope of the embodiments encompassed by the appended claims. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A system for simulating and previewing billboards in selected environments, comprising:

a memory;

a display;

at least one database;

at least one processor communicatively coupled to the memory, the display, and the at least one database, the processor configured to execute computer readable instructions stored in the memory to perform operations comprising:

accessing graphical data and at least one advertisement from the at least one database;

setting a perceived traveling speed based on a user's vantage point;

generating on the display a three-dimensional (3D) moving representation of an environment corresponding to a location of a billboard to be previewed, the billboard comprising the at least one advertisement, from a moving perspective of a user comprising a passerby traveling along a roadway or travel path, the three-dimensional (3D) moving representation of the environment comprising the billboard at a specific location displaying the at least one advertisement such that visualization of the billboard corresponds to the user's vantage point; and updating the 3D moving representation of the environment and the billboard in response to changes in the user's vantage point in real time while the passerby travels along the roadway or travel path.

2. The system of claim 1, wherein the at least one advertisement includes at least one of alphabets, numbers, words, symbols, images, graphics and videos.

3. The system of claim 1, wherein the environment comprises at least one of virtual image mode and actual image mode.

4. The system of claim 1, wherein the environment includes elements stored in or uploaded to the at least one database.

5. The system of claim 1, wherein the processor is further configured to perform operations comprising creating at least one of dynamic video format and static image format of the 3D moving representation of the environment and the billboard.

6. The system of claim 1, wherein the generating step further comprises modifying parameters of the billboard or modifying the at least one advertisement.

7. The system of claim 1, wherein the generating step further comprises altering sensory stimuli of the environment.

8. The system of claim 7, wherein the updating step includes updating the 3D moving representation of the environment in response to the altering sensory stimuli of the environment.

9. The system of claim 8, wherein the processor is further configured to perform operations comprising creating at least one of dynamic video format and static image format of the 3D moving representation of the environment and the billboard.

10. The system of claim 9, wherein the at least one of dynamic video format and static image format can be displayed on portable electronic devices including AR/VR headsets.

11. A method for simulating and previewing billboards in selected environments, comprising:

in a system having at least one processor communicatively coupled to a memory, a display, and at least one database, wherein the processor is configured to execute computer readable instructions stored in the memory to perform operations including:

accessing, by the processor, of graphical data and at least one advertisement from the at least one database;

setting, by the processor, a perceived traveling speed based on a user's vantage point;

generating, by the processor, on the display a three-dimensional (3D) moving representation of an environment corresponding to a location of a billboard to be previewed, the billboard comprising the at least one advertisement, from a moving perspective of a user comprising a passerby traveling along a roadway or travel path, the three-dimensional (3D) moving representation of the environment comprising the billboard at a specific location displaying the at least one advertisement such that visualization of the billboard corresponds to the user's vantage point; and updating, by the processor, of the 3D moving representation of the environment and the billboard in response to changes in the user's vantage point in real time while the passerby travels along the roadway or travel path.

12. The method of claim 11, wherein the at least one advertisement includes at least one of alphabets, numbers, words, symbols, images, graphics and videos.

13. The method of claim 11, wherein the environment comprises at least one of virtual image mode and actual image mode.

14. The method of claim 11, wherein the environment includes elements stored in or uploaded to the at least one database.

15. The method of claim 11, further comprising creating, by the processor, at least one of dynamic video format and static image format of the 3D moving representation of the environment and the billboard.

16. The method of claim 11, wherein the generating step further comprises modifying, by the processor, parameters of the billboard or the at least one advertisement.

17. The method of claim 11, wherein the generating step further comprises altering, by the processor, on the display the 3D moving representation of sensory stimuli of the environment.

18. The method of claim 17, wherein the updating step includes updating the 3D moving representation of the environment in response to the altering sensory stimuli of the environment.

19. The method of claim 18, further comprising creating, by the processor, at least one of dynamic video format and static image format of the 3D moving representation of the environment and the billboard.

20. The method of claim 19, further comprising displaying, on portable electronic devices including AR/VR headsets, the at least one of dynamic video format and static image format of the 3D moving representation of the environment and the billboard.

* * * * *